(12) United States Patent
Aue et al.

(10) Patent No.: US 10,333,599 B2
(45) Date of Patent: Jun. 25, 2019

(54) ANTENNA ARRAY BEAMFORMING IN A REMOTE UNIT(S) IN A WIRELESS DISTRIBUTION SYSTEM (WDS)

(71) Applicant: Corning Optical Communications LLC, Hickory, NC (US)

(72) Inventors: Volker Aue, Dresden (DE); Albrecht Fehske, Dresden (DE); Yuval Zinger, Charlotte, NC (US); Roi Yosy Ziv, Ramat Gan (IL)

(73) Assignee: Corning Optical Communications LLC, Hickory, NC (US)

( * ) Notice: Subject to any disclaimer, the term of this patent is extended or adjusted under 35 U.S.C. 154(b) by 133 days.

(21) Appl. No.: 15/264,024

(22) Filed: Sep. 13, 2016

(65) Prior Publication Data
US 2018/0076869 A1 Mar. 15, 2018

(51) Int. Cl.
*H04B 7/06* (2006.01)
*H04L 5/14* (2006.01)
*H04B 7/022* (2017.01)
*H04B 7/0413* (2017.01)

(52) U.S. Cl.
CPC .......... *H04B 7/0617* (2013.01); *H04B 7/022* (2013.01); *H04L 5/14* (2013.01); *H04B 7/0413* (2013.01)

(58) Field of Classification Search
CPC .. H04B 7/0613; H04B 7/0615; H04B 7/0617; H04B 7/0671; H04B 7/04; H04B 7/0404; H04B 7/0408; H04B 7/0413; H04B 7/022; H04L 5/14
See application file for complete search history.

(56) References Cited

U.S. PATENT DOCUMENTS

| 5,019,793 | A  | * | 5/1991 | McNab | ...................... H01P 5/04 333/139 |
| 6,504,517 | B1 | * | 1/2003 | Liu | ........................ H01Q 1/246 343/853 |
| 7,593,729 | B2 | * | 9/2009 | Barak | .................. H04B 7/0408 235/380 |
| 7,663,546 | B1 | * | 2/2010 | Miyamoto | ........... H01Q 3/2652 342/154 |
| 2002/0187812 | A1 | * | 12/2002 | Guo | ....................... H01Q 1/246 455/562.1 |

(Continued)

FOREIGN PATENT DOCUMENTS

EP 2113145 B1 1/2011

*Primary Examiner* — Kevin D Mew
(74) *Attorney, Agent, or Firm* — C. Keith Montgomery

(57) ABSTRACT

Embodiments of the disclosure relate to antenna array beamforming in a remote unit(s) in a wireless distribution system (WDS). In this regard, a remote unit in a WDS includes an antenna array having a plurality of radio frequency (RF) antennas. The RF antennas transmit a plurality of modified downlink RF signals in a plurality of phases. A control circuit in the remote unit determines the phases to cause the RF antennas to transmit a formed radiation beam(s) in a radiation direction(s). The control circuit controls a plurality of phase shifters to generate the modified downlink RF signals in the phases. By supporting antenna array beamforming in the remote unit, it is possible to steer the formed radiation beam(s) according to a specific floor layout(s) to provide enhanced indoor RF coverage in the WDS. As a result, it may be possible to reduce deployment and/or installation costs of the WDS.

25 Claims, 16 Drawing Sheets

(56) References Cited

U.S. PATENT DOCUMENTS

| | | | | |
|---|---|---|---|---|
| 2005/0221861 | A1* | 10/2005 | Zeira | H04B 7/0408 |
| | | | | 455/562.1 |
| 2011/0255434 | A1* | 10/2011 | Ylitalo | H01Q 1/246 |
| | | | | 370/252 |
| 2013/0286960 | A1* | 10/2013 | Li | H04W 72/042 |
| | | | | 370/329 |
| 2013/0301454 | A1* | 11/2013 | Seol | H04B 7/043 |
| | | | | 370/252 |
| 2015/0365934 | A1* | 12/2015 | Liu | H04L 5/0039 |
| | | | | 370/329 |
| 2016/0352002 | A1* | 12/2016 | Aue | H01Q 1/246 |
| 2017/0272872 | A1* | 9/2017 | Bauman | H04B 17/309 |
| 2017/0331533 | A1* | 11/2017 | Strong | H04B 7/0452 |

* cited by examiner

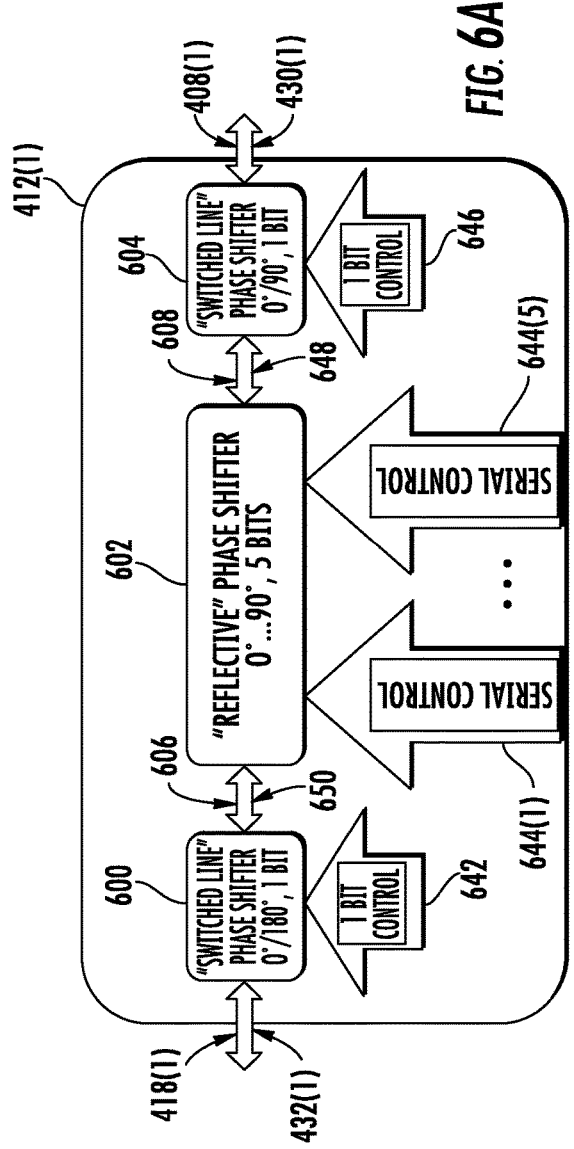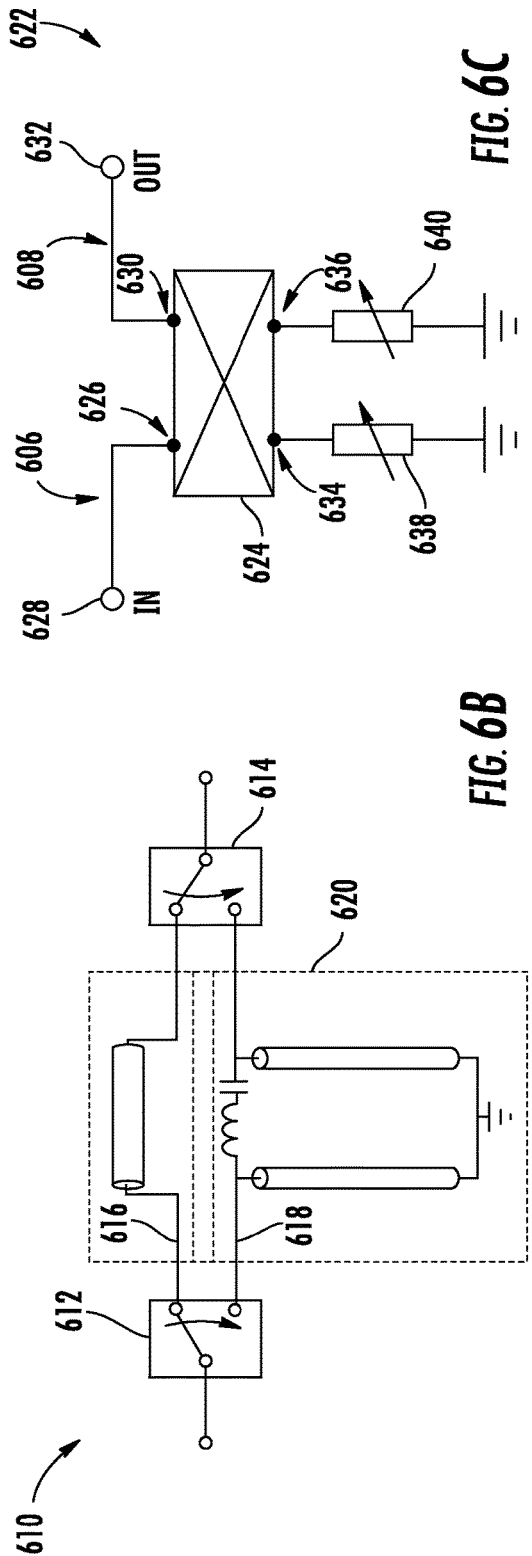
FIG. 6A
FIG. 6B
FIG. 6C

ANTENNA ARRAY BEAMFORMING IN A REMOTE UNIT(S) IN A WIRELESS DISTRIBUTION SYSTEM (WDS)

BACKGROUND

The disclosure relates generally to a wireless distribution system (WDS) and more particularly to techniques for supporting antenna array beamforming in a remote unit(s) in a WDS.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of distributed antenna systems (DASs). DASs include remote units configured to receive and transmit communications signals to client devices within the antenna range of the remote units. DASs can be particularly useful when deployed inside buildings or other indoor environments where the wireless communications devices may not otherwise be able to effectively receive radio frequency (RF) signals from a signal source.

In this regard, FIG. 1 illustrates distribution of communication services to remote coverage areas 100(1)-100(N) of a WDS 102 provided in the form of a DAS, wherein 'N' is the number of remote coverage areas. These communication services can include cellular services, wireless services, such as radio frequency identification (RFID) tracking, Wireless Fidelity (Wi-Fi), local area network (LAN), wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote antenna units (RAUs) 104(1)-104(N) connected to a head-end equipment (HEE) 106 (e.g., a head-end controller, a head-end unit (HEU), or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the RAUs 104(1)-104(N). The RAUs 104(1)-104(N) are configured to receive the downlink communications signals 110D from the HEE 106 over a communications medium 112 to be distributed to the respective remote coverage areas 100(1)-100(N) of the RAUs 104(1)-104(N). In a non-limiting example, the communications medium 112 may be a wired communications medium, a wireless communications medium, or an optical fiber-based communications medium. Each of the RAUs 104(1)-104(N) may include an RF transmitter/receiver and a respective antenna 114(1)-114(N) operably connected to the RF transmitter/receiver to wirelessly distribute the communication services to client devices 116 within the respective remote coverage areas 100(1)-100(N). The RAUs 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective RAUs 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the RAUs 104(1)-104(N) mainly determine the size of the respective remote coverage areas 100(1)-100(N).

Each of the antennas 114(1)-114(N) may be provided as an omnidirectional antenna, which provides equal radiation to three hundred sixty degrees (360°) around the antenna in the horizontal plan. In this regard, an omnidirectional antenna is well-suited to provide RF coverage in a circular-shaped coverage area. However, an omnidirectional antenna may not be particularly effective in providing effective RF coverage in such indoor areas that include irregularly shaped areas, such as hallways, rectangular-shaped rooms, and irregular-shaped offices. Further, it may be particularly difficult to provide effective RF coverage at endpoints in these indoor areas, such near exterior windows and corners where an RF coverage area may not reach, or only reach if the RF coverage area is boosted, which may then overextend the RF coverage area outside the indoor area in an unintended manner. For example, extending a WDS RF coverage area outside an intended indoor area may cause outdoor client devices to be within indoor RF coverage areas in an unintended manner. In this regard, it may be desirable to effectively control directional radiation patterns of the antennas 114(1)-114(N) to meet specific coverage requirements of the client devices 116 located at certain endpoints in the respective remote coverage areas 100(1)-100(N), especially when the respective remote coverage areas 100(1)-100(N) are not circular-shaped.

No admission is made that any reference cited herein constitutes prior art. Applicant expressly reserves the right to challenge the accuracy and pertinency of any cited documents.

SUMMARY

Embodiments of the disclosure relate to antenna array beamforming in a remote unit(s) in a wireless distribution system (WDS). By supporting antenna array beamforming in a remote unit, it is possible to steer a formed radiation beam according to a specific floor layout(s) to provide enhanced indoor radio frequency (RF) coverage in the WDS. As a result, it may be possible to reduce deployment and/or installation costs of the WDS and provide additional opportunities for supporting more advanced applications in the WDS. In this regard, at least one remote unit in a WDS includes an antenna array having a plurality of RF antennas (e.g., omnidirectional antennas). The RF antennas are configured to transmit a plurality of modified downlink RF signals in a plurality of phases. A control circuit in the remote unit(s) is configured to determine the phases for the modified downlink RF signals to cause the RF antennas to transmit at least one formed radiation beam in at least one radiation direction. The control circuit is further configured to control a plurality of phase shifters to generate the modified downlink RF signals in the phases determined by the control circuit.

In one embodiment, a remote unit in a WDS is provided. The remote unit includes an antenna array comprising a plurality of RF antennas configured to transmit a plurality of modified downlink RF signals in at least one formed radiation beam in at least one radiation direction. The remote unit also includes a plurality of phase shifters. The plurality of phase shifters is configured to phase-shift a plurality of downlink RF signals to generate the plurality of modified downlink RF signals in a plurality of phases, respectively. The plurality of phase shifters is also configured to provide the plurality of modified downlink RF signals to the plurality of RF antennas in the antenna array. The remote unit also includes a control circuit. The control circuit is configured to determine the plurality of phases to cause the plurality of RF antennas to transmit the plurality of modified downlink RF signals in the at least one formed radiation beam in the at least one radiation direction. The control circuit is also configured to control the plurality of phase shifters to generate the plurality of modified downlink RF signals in the plurality of phases, respectively.

In another embodiment, a method for supporting antenna array beamforming in a remote unit in a WDS is provided. The method includes determining a plurality of phases to cause a plurality of RF antennas in an antenna array in the remote unit to transmit a plurality of modified downlink RF signals in at least one formed radiation beam in at least one radiation direction. The method also includes phase-shifting a plurality of downlink RF signals to generate the plurality of modified downlink RF signals in the plurality of phases, respectively. The method also includes providing the plurality of modified downlink RF signals to the plurality of RF antennas in the antenna array. The method also includes transmitting the plurality of modified downlink RF signals from the plurality of RF antennas in the at least one formed radiation beam in the at least one radiation direction.

In another embodiment, a WDS is provided. The WDS includes a central unit and a plurality of remote units. The plurality of remote units is configured to receive a plurality of downlink electrical communications signals from the central unit. The plurality of remote units is also configured to provide a plurality of uplink electrical communications signals to the central unit. One or more of the plurality of remote units includes an antenna array comprising a plurality of RF antennas configured to transmit a plurality of modified downlink RF signals in at least one formed radiation beam in at least one radiation direction. One or more of the plurality of remote units also includes a plurality of phase shifters. The plurality of phase shifters is configured to phase-shift a plurality of downlink RF signals to generate the plurality of modified downlink RF signals in a plurality of phases, respectively. The plurality of phase shifters is also configured to provide the plurality of modified downlink RF signals to the plurality of RF antennas in the antenna array. One or more of the plurality of remote units also includes a control circuit. The control circuit is configured to determine the plurality of phases to cause the plurality of RF antennas to transmit the plurality of modified downlink RF signals in the at least one formed radiation beam in the at least one radiation direction. The control circuit is also configured to control the plurality of phase shifters to generate the plurality of modified downlink RF signals in the plurality of phases, respectively.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 6A is a schematic diagram of an exemplary phase shifter that can be provided in the remote unit of FIG. 4 to generate a three-hundred-sixty-degree (360°) phase shift;

FIG. 6B is a schematic diagram of an exemplary switched line phase shifter that can be provided in the phase shifter of FIG. 6A to provide a larger phase shift with coarse resolution;

FIG. 6C is a schematic diagram of an exemplary reflective phase shifter that can be provided in the phase shifter of FIG. 6A to provide a smaller phase shift with fine resolution;

DETAILED DESCRIPTION

Embodiments of the disclosure relate to antenna array beamforming in a remote unit(s) in a wireless distribution system (WDS). By supporting antenna array beamforming in a remote unit, it is possible to steer a formed radiation beam according to a specific floor layout(s) to provide enhanced indoor radio frequency (RF) coverage in the WDS. As a result, it may be possible to reduce deployment and/or installation costs of the WDS and provide additional opportunities for supporting more advanced applications in the WDS. In this regard, at least one remote unit in a WDS includes an antenna array having a plurality of RF antennas (e.g., omnidirectional antennas). The RF antennas are configured to transmit a plurality of modified downlink RF signals in a plurality of phases. A control circuit in the remote unit(s) is configured to determine the phases for the modified downlink RF signals to cause the RF antennas to transmit at least one formed radiation beam in at least one radiation direction. The control circuit is further configured to control a plurality of phase shifters to generate the modified downlink RF signals in the phases determined by the control circuit.

Figure 1:
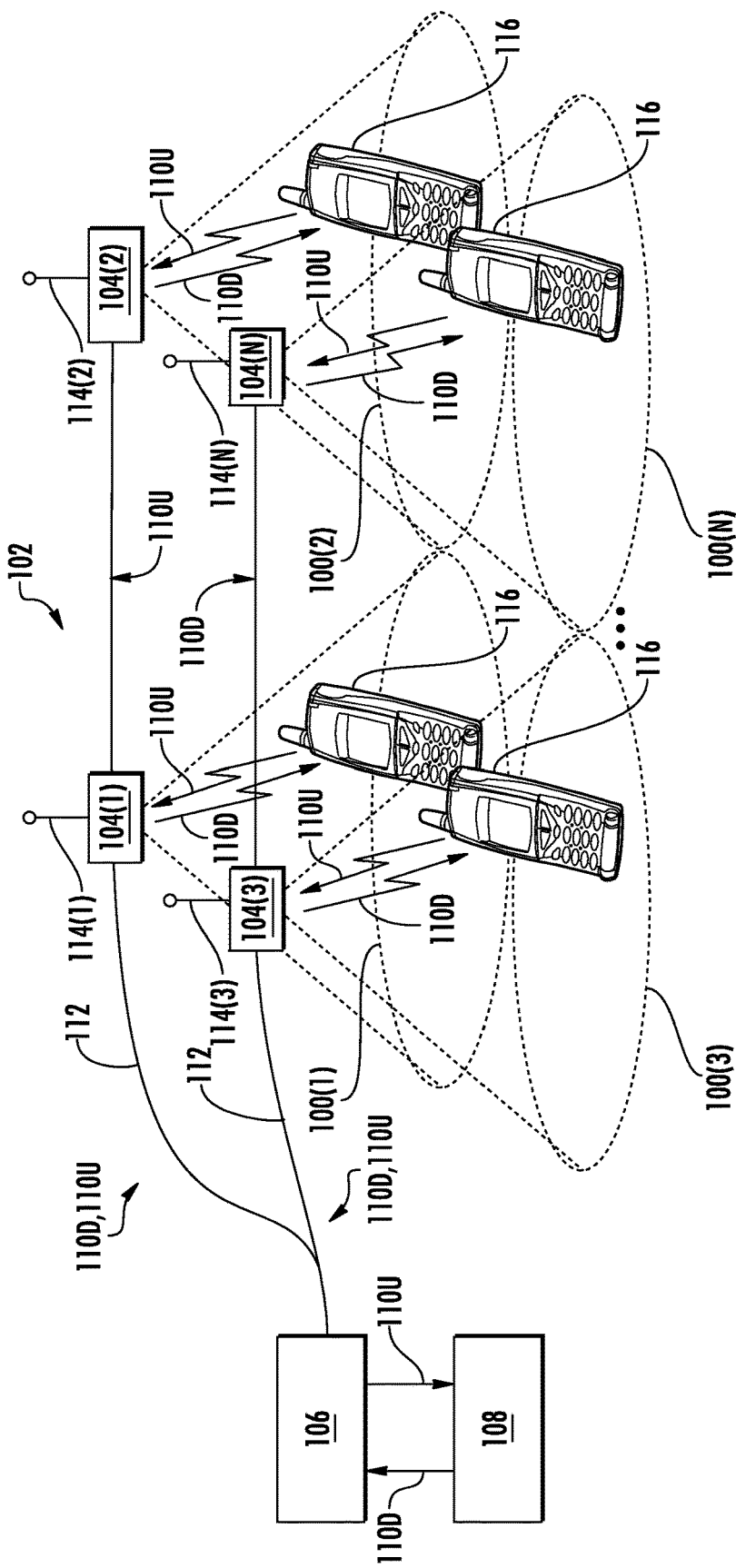
FIG. 1 is a schematic diagram of an exemplary wireless distribution system (WDS)
Figure 2B:
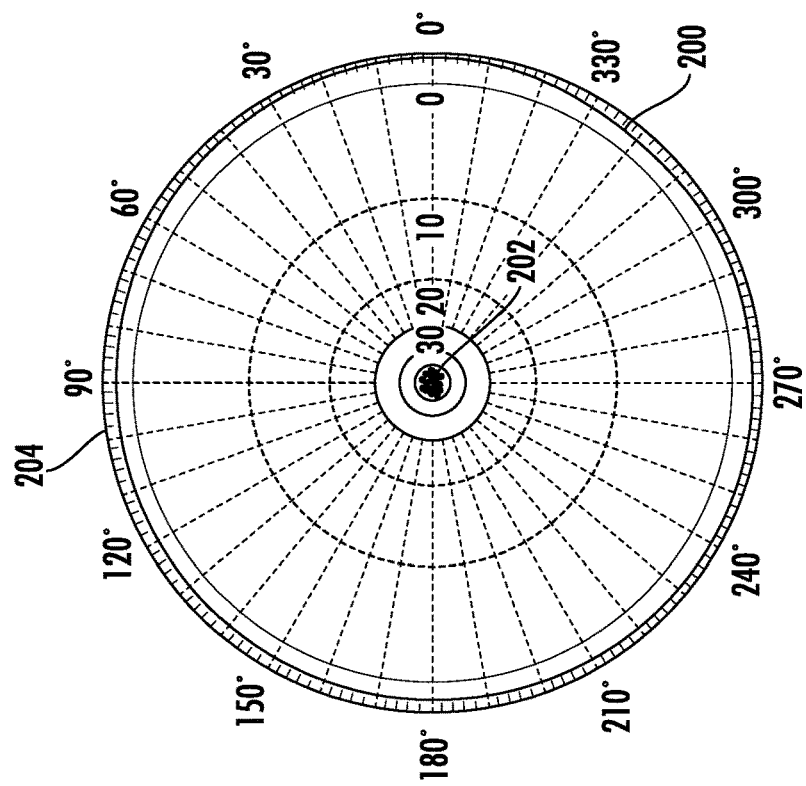
FIGS. 2A and 2B are schematic diagrams providing exemplary illustrations of vertical and horizontal views of a radiation pattern of an omnidirectional antenna, respectively.
Figure 2A:
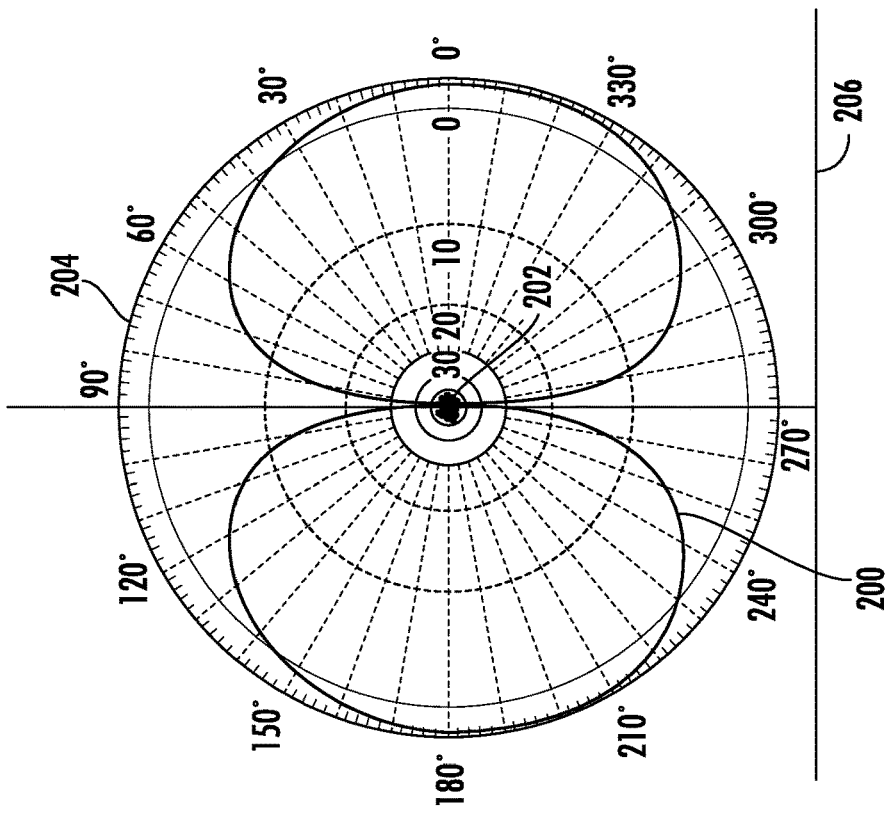
Figure 3A:
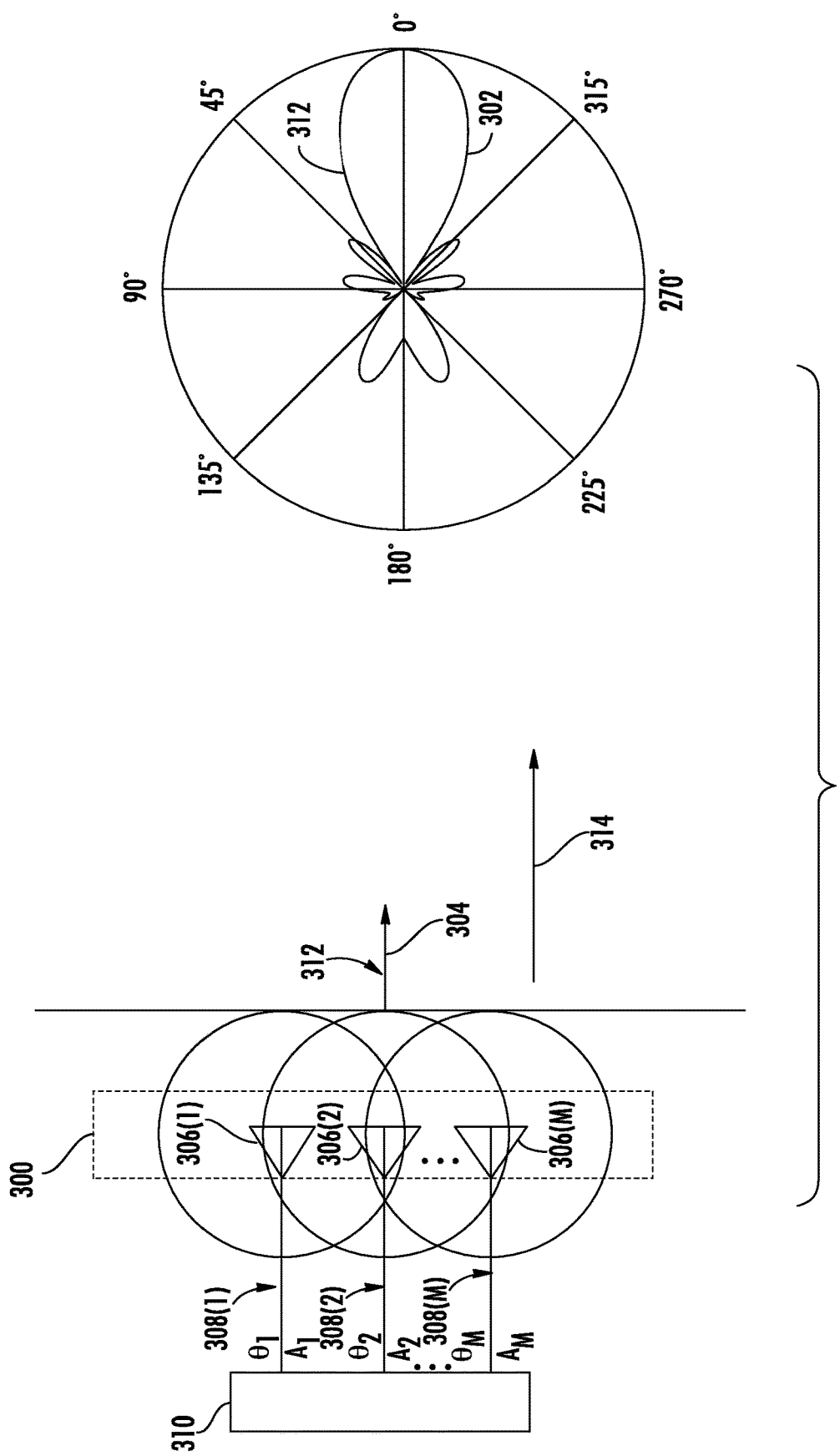
FIG. 3A is a schematic diagram of an exemplary antenna array configured to transmit a formed radiation beam in a radiation direction based on antenna array beamforming techniques.
Figure 3B:
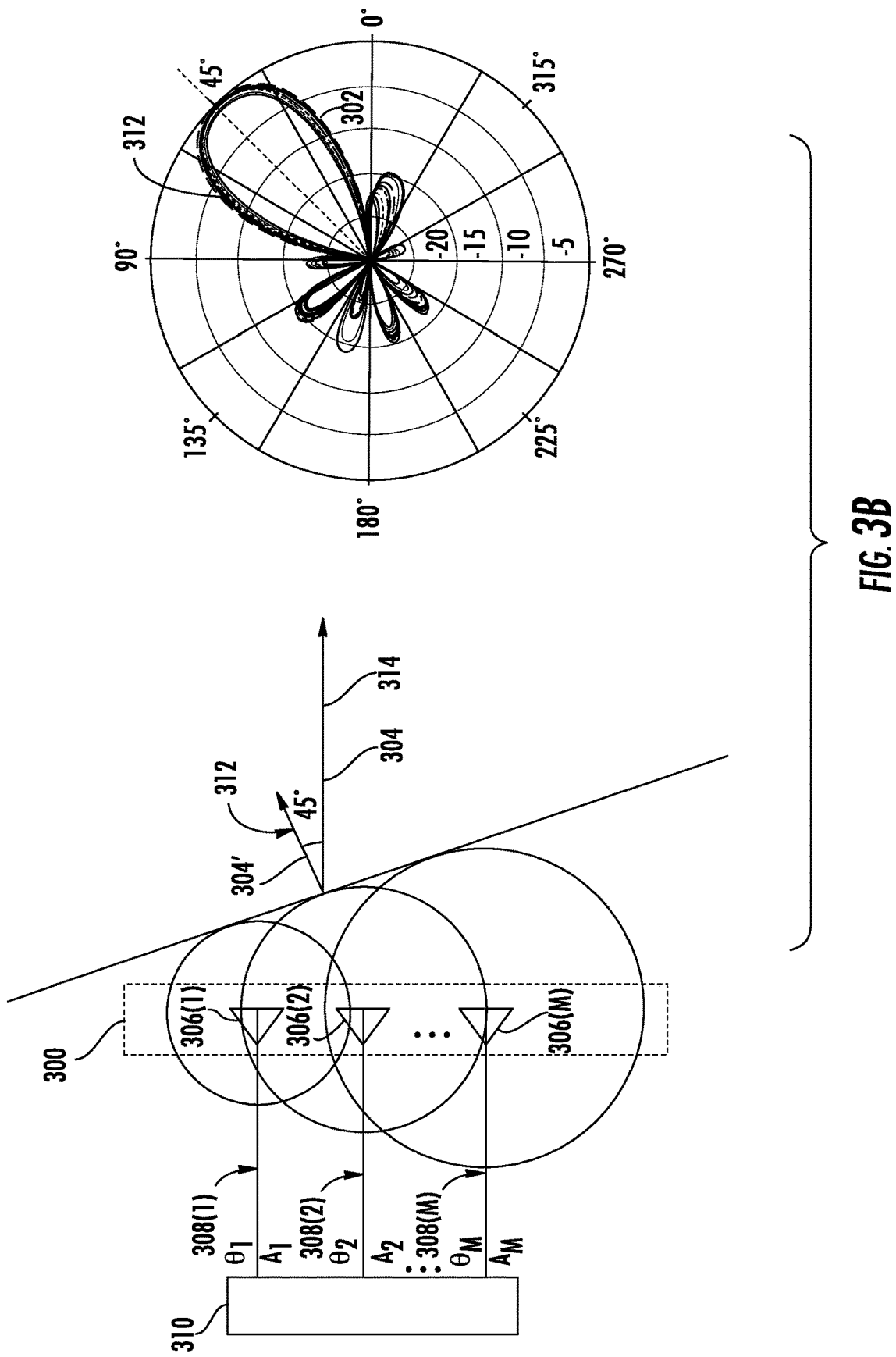
FIG. 3B is a schematic diagram providing an exemplary illustration of the antenna array of FIG. 3A configured to transmit a formed radiation beam in a radiation direction that is different from the radiation direction of FIG. 3A.

Before discussing exemplary aspects of supporting beamforming in a remote unit(s) in a WDS that includes specific exemplary aspects of the present disclosure starting at FIGS. 3A and 3B, a brief overview of radiation patterns of omnidirectional antennas are first provided in FIGS. 2A and 2B.

In this regard, FIGS. 2A and 2B are schematic diagrams providing exemplary illustrations of vertical and horizontal views of a radiation pattern 200 of an omnidirectional antenna 202, respectively. As illustrated in FIGS. 2A and 2B, the omnidirectional antenna 202 spreads RF energy uniformly in a sphere 204. According to the vertical view of the radiation pattern 200 in FIG. 2A, the omnidirectional antenna 202 may have some directivity towards a ground 206. As such, the omnidirectional antenna 202 may generate an elevation gain toward the ground 206. However, according to the horizontal view of FIG. 2B, the omnidirectional antenna 202 has no directivity and, thus, provides zero decibels-isotropic (0 dBi) gain.

Because the omnidirectional antenna 202 spreads RF energy uniformly in the sphere 204, the omnidirectional antenna 202 may be suited to providing RF coverage in a circular-shaped indoor coverage area. However, the omnidirectional antenna 202 may not provide desired RF coverage in such indoor coverage areas that require the RF energy to be concentrated in a specific direction(s) or in non-circular shaped areas, as opposed to being spread uniformly around the omnidirectional antenna 202. In a non-liming example, an RF coverage area in a building can be a long, narrow hallway (e.g., length is significantly greater than width). Accordingly, it may be desirable to direct the RF energy to sufficiently cover the entire length of the hallway. In other words, more RF energy is preferentially directed along the length of the hallway than along the width of the hallway. In this regard, if the omnidirectional antenna 202 is configured to cover the entire length of the hallway, the omnidirectional antenna 202 will generate excessive RF energy along the width of the hallway. As a result, the RF energy radiated along the width of the hallway may be absorbed by walls of the hallway. Moreover, the excessive RF energy radiated along the width of the hallway may cause interference to adjacent coverage areas. As such, it may be desirable to utilize antenna array beamforming techniques to direct the RF energy along the length of the hallway, while suppressing RF energy along the width of the hallway.

Thus, in exemplary embodiments herein discussed in more detail below, WDSs and related components are provided that support antenna array beamforming in a remote unit(s). In this regard, FIG. 3A is a schematic diagram of an exemplary antenna array 300 that can be provided in a remote unit in a WDS. The antenna array 300 is configured to transmit a formed radiation beam 302 in a radiation direction 304 based on antenna array beamforming techniques. With reference to FIG. 3A, the antenna array 300 includes a plurality of RF antennas 306(1)-306(M), which may be omnidirectional antennas for example. The RF antennas 306(1)-306(M) receive and transmit a plurality of RF signals 308(1)-308(M), respectively. To generate the formed radiation beam 302 (also known as "beamforming") from the antenna array 300, a beamforming network 310 is configured to manipulate respective phases $\theta_1$-$\theta_M$ of the RF signals 308(1)-308(M) that are fed to the RF antennas 306(1)-306(M). When the respective phases $\theta_1$-$\theta_M$ of the RF signals 308(1)-308(M) are substantially similar, the RF signals 308(1)-308(M) can be constructively combined to generate the formed radiation beam 302 having an effective radiation beam 312 reinforced in the radiation direction 304 and suppressed in radiation directions other than the radiation direction 304. In this regard, the radiation direction 304 can be directed along the length of the long, narrow hallway in the building. In a non-limiting example, the beamforming network 310 can be configured to include such passive components as splitter combiner(s) and phase shifter(s). Accordingly, the beamforming network 310 can be referred to as a passive beamforming network 310.

In a non-limiting example, the effective radiation beam 312 of the RF antennas 306(1)-306(M) can be configured to be substantially parallel to an orientation 314 of the RF antennas 306(1)-306(M). In this regard, the passive beamforming network 310 manipulates the respective phases $\theta_1$-$\theta_M$ of the RF signals 308(1)-308(M) to be substantially aligned with the orientation 314 (e.g., with a zero-degree (0°) phase shift). In one non-limiting example, the passive beamforming network 310 can further configure respective amplitudes $A_1$-$A_M$ of the RF antennas 306(1)-306(M) to be substantially similar. In another non-limiting example, it is also possible to configure selective respective amplitudes $A_1$-$A_M$ of the RF antennas 306(1)-306(M) to be smaller than the rest of the respective amplitudes $A_1$-$A_M$. As a result, the passive beamforming network 310 can control the RF antennas 306(1)-306(M) to generate the effective radiation beam 312 that is substantially parallel to the orientation 314 of the RF antennas 306(1)-306(M).

The effective radiation beam 312 can also be directed to different radiation directions without changing the orientation 314 of the RF antennas 306(1)-306(M). In this regard, FIG. 3B is a schematic diagram providing an exemplary illustration of the antenna array 300 of FIG. 3A configured to transmit a formed radiation beam 302' in a radiation direction 304' that is different from the radiation direction 304 of FIG. 3A. Common elements between FIGS. 3A and 3B are shown therein with common element numbers and will not be re-described herein.

With reference to FIG. 3B, in a non-limiting example, the passive beamforming network 310 changes the respective phases $\theta_1$-$\theta_M$ of the RF signals 308(1)-308(M) to be substantially equal to forty-five degrees (45°). The beamforming network 310 may also configure the respective amplitudes $A_1$-$A_M$ of the RF signals 308(1)-308(M) in ascending magnitudes ($A_1 < A_2 < \ldots A_M$). As a result, the passive beamforming network 310 can steer the effective radiation beam 312 of the RF antennas 306(1)-306(M) in the radiation direction 304', which is different from the radiation direction 304 by approximately 45°, for example. Hence, by controlling the respective phases $\theta_1$-$\theta_M$ and/or the respective amplitudes $A_1$-$A_M$ of the RF signals 308(1)-308(M), it is possible to steer the effective radiation beam 312 to a desired direction without changing the orientation 314 of the RF antennas 306(1)-306(M).

Figure 4:
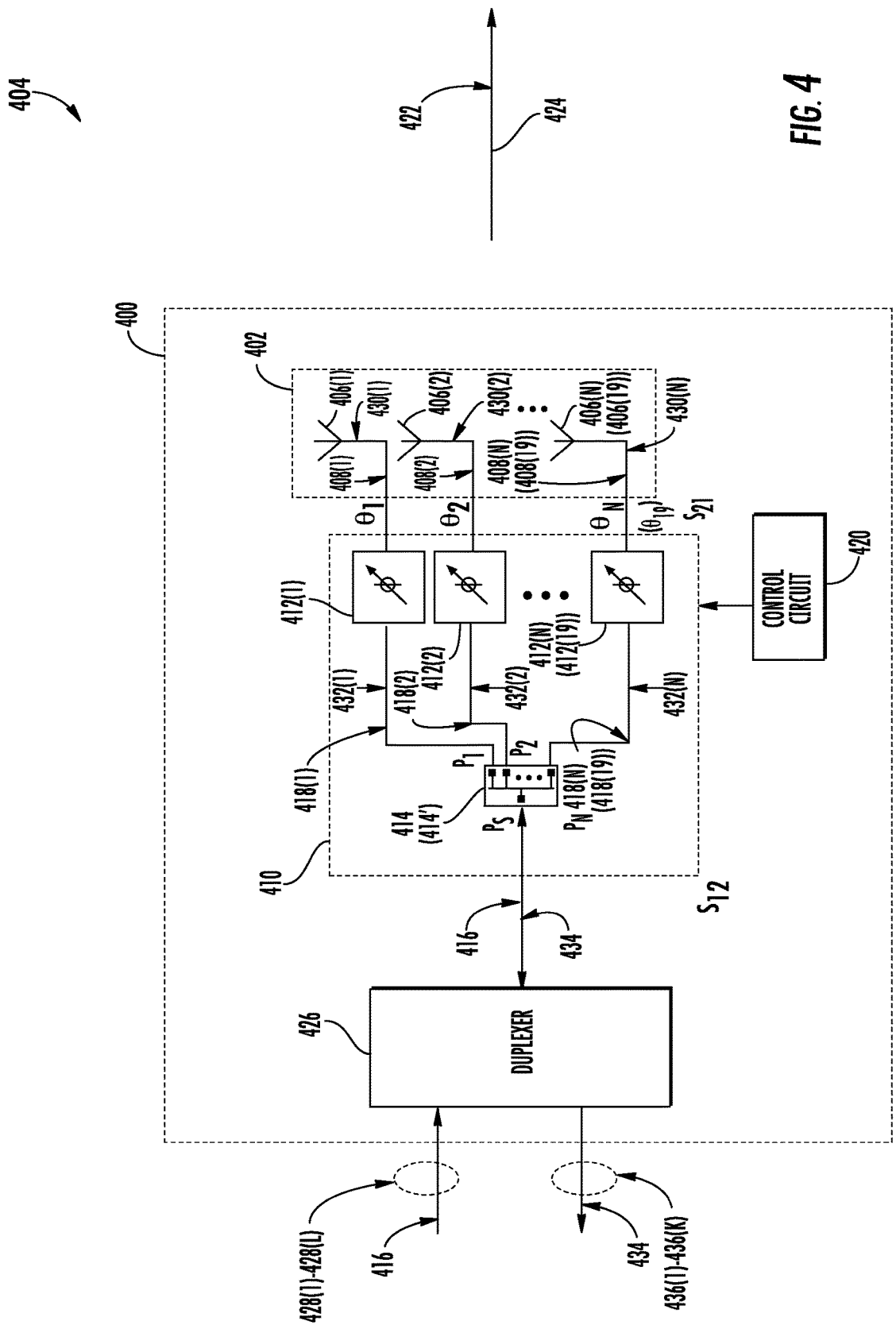
FIG. 4 is a schematic diagram of an exemplary remote unit in a wireless distribution system (WDS) having an antenna array configured to provide enhanced radio frequency (RF) coverage in the WDS via antenna array beamforming.

The antenna array 300 and the passive beamforming network 310 can be provided in a remote unit in a WDS to help improve RF coverage in such indoor coverage areas such as a long, narrow hallway by steering the effective radiation beam 312 of the antenna array 300 along the length of the hallway. In this regard, FIG. 4 is a schematic diagram of an exemplary remote unit 400 having an antenna array 402 configured to provide enhanced RF coverage in a WDS 404 via antenna array beamforming. The antenna array 402 includes a plurality of RF antennas 406(1)-406(N), which may be omnidirectional RF antennas such as monopole antennas for example. The RF antennas 406(1)-406(N) are configured to transmit a plurality of modified downlink RF signals 408(1)-408(N), respectively. The RF antennas 406(1)-406(N) are coupled to a passive beamforming network 410, which includes a plurality of phase shifters 412(1)-412(N) and a splitter combiner 414. The passive beamforming network 410 is reciprocal in phases and losses in this example. As such, the passive beamforming network 410 has a forward voltage gain $S_{21}$ that is substantially equal to a reverse voltage gain $S_{12}$ ($S_{21}$=$S_{12}$) in this example. Accordingly, the passive beamforming network 410 can be provided in both downlink and uplink paths of the remote unit 400.

With continuing reference to FIG. 4, the splitter combiner 414 is configured to split a downlink RF communications signal 416 into a plurality of downlink RF signals 418(1)-418(N). The phase shifters 412(1)-412(N) are configured to phase-shift the downlink RF signals 418(1)-418(N) to generate the modified downlink RF signals 408(1)-408(N) in a plurality of phases $\theta_1$-$\theta_N$, respectively. The remote unit 400 includes a control circuit 420, which may be a microprocessor or a microcontroller as non-limiting examples. The control circuit 420 is configured to determine the phases $\theta_1$-$\theta_N$ to cause the RF antennas 406(1)-406(N) to transmit the modified downlink RF signals 408(1)-408(N) in at least one formed radiation beam 422, such as the formed radiation beam 302 of FIG. 3A or the formed radiation beam 302' of FIG. 3B. In a non-limiting example, the formed radiation beam 422 is a main radiation lobe of the antenna array 402. The phases $\theta_1$-$\theta_N$ are so determined to cause the modified downlink RF signals 408(1)-408(N) to be constructively combined at the antenna array 402 to transmit the formed radiation beam 422. Further, the phases $\theta_1$-$\theta_N$ are so determined to cause the antenna array 402 to transmit the formed radiation beam 422 in at least one radiation direction 424. In a non-limiting example, the formed radiation beam 422 is substantially similar to the effective radiation beam 312 of FIGS. 3A and 3B. Likewise, the radiation direction 424 is substantially similar to the radiation direction 304 of FIG. 3A or the radiation direction 304' of FIG. 3B. The control circuit 420 controls the phase shifters 412(1)-412(N) in the passive beamforming network 410 to generate the modified downlink RF signals 408(1)-408(N) in the phases $\theta_1$-$\theta_N$, respectively. The phase shifters 412(1)-412(N) in turn provide the modified downlink RF signals 408(1)-408(N) to the RF antennas 406(1)-406(N).

According to previous discussions in FIGS. 3A and 3B, the passive beamforming network 410 can manipulate the phases $\theta_1$-$\theta_N$ and/or amplitudes in the modified downlink RF signals 408(1)-408(N) to steer the radiation direction 424 without changing physical orientations of the RF antennas 406(1)-406(N). By controlling the respective phases $\theta_1$-$\theta_N$ of the modified downlink RF signals 408(1)-408(N), it is possible to transmit the formed radiation beam 422 from the antenna array 402 with higher directivity in the radiation direction 424. As a result, the remote unit 400 can be configured to improve RF coverage in such indoor coverage areas as the long, narrow hallway referenced in FIG. 2 by steering the formed radiation beam 422 along the length of the hallway. In this regard, it may be possible to adapt the formed radiation beam 422 according to specific floor layout(s) to provide enhanced indoor RF coverage in an entire building(s). As a result, it may be possible to reduce deployment and/or installation costs of the WDS 404. Further, by configuring the remote unit 400 to support antenna array beamforming, it may be possible to provide additional opportunities for supporting more advanced applications in the WDS 404.

The remote unit 400 can be configured to support antenna array beamforming according to a process. In this regard, FIG. 5 is a flowchart of an exemplary process 500 that can be employed by the remote unit 400 of FIG. 4 for supporting antenna array beamforming in the WDS 404.

Figure 5:
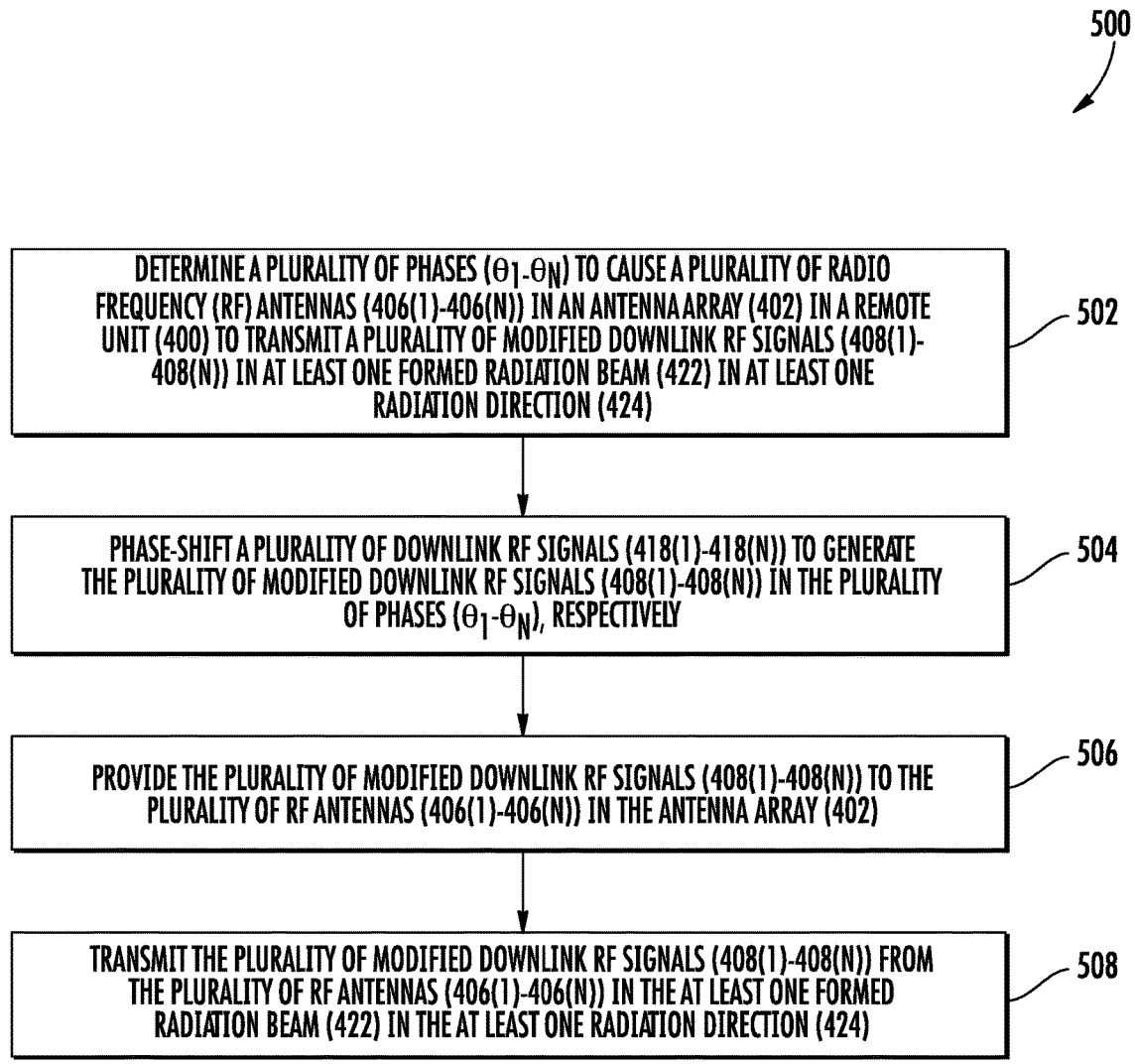
FIG. 5 is a flowchart of an exemplary process that can be employed by the remote unit of FIG. 4 for supporting antenna array beamforming in the WDS.

With reference to FIG. 5, the control circuit 420 is configured to determine the phases $\theta_1$-$\theta_N$ to cause the RF antennas 406(1)-406(N) in the antenna array 402 in the remote unit 400 to transmit the modified downlink RF signals 408(1)-408(N) in the formed radiation beam 422 in the radiation direction 424 (block 502). The phase shifters 412(1)-412(N) are controlled by the control circuit 420 to phase-shift the downlink RF signals 418(1)-418(N) to generate the modified downlink RF signals 408(1)-408(N) in the phases $\theta_1$-$\theta_N$, respectively (block 504). The phase shifters 412(1)-412(N) then provide the modified downlink RF signals 408(1)-408(N) to the RF antennas 406(1)-406(N) (block 506). The RF antennas 406(1)-406(N) transmit the modified downlink RF signals 408(1)-408(N) in the formed radiation beam 422 in the radiation direction 424 (block 508).

With reference back to FIG. 4, the remote unit 400 includes a duplexer circuit 426. The duplexer circuit 426 is configured to receive the downlink RF communications signal 416. The downlink RF communications signal 416 corresponds to one or more downlink communications services 428(1)-428(L). In a non-limiting example, the downlink communications services 428(1)-428(L) include an Advanced Wireless Services (AWS) service(s) and a Personal Communications Service (PCS) service(s). The antenna array 402 is configured to transmit the downlink RF communications signal 416 in a predetermined RF band. In a non-limiting example, the predetermined RF band occupies an RF spectrum between 1710 megahertz (MHz) and 2180 MHz. In this regard, the predetermined RF band has a center frequency of 1945 MHz.

In a non-limiting example, the remote unit 400 receives a downlink digital communications signal from central unit. In this regard, the remote unit 400 may include a digital-to-analog converter (DAC) to convert the downlink digital communications signal into the downlink RF communications signal 416 before providing the downlink RF communications signal 416 to the duplexer circuit 426. In this regard, the remote unit 400 is a digital remote unit. In another non-limiting example, the remote unit 400 receives the downlink RF communications signal 416 from the central unit. Accordingly, the remote unit 400 would be an analog remote unit. It shall be appreciated that the remote unit 400 can be configured to support antenna array beamforming regardless of whether the remote unit 400 is a digital or an analog remote unit.

With continuing reference to FIG. 4, the downlink RF communications signal 416 has a determined power level $P_S$. The splitter combiner 414 is configured to split the determined power level $P_S$ into a plurality of power levels $P_1$-$P_N$ and associate the power levels $P_1$-$P_N$ with the downlink RF signals 418(1)-418(N), respectively. A non-limiting example of the splitter combiner 414 is further discussed with reference to FIG. 7 later in this disclosure.

As previously discussed, the passive beamforming network 410 is reciprocal in phases and losses. Accordingly, the passive beamforming network 410 can be provided in both downlink and uplink paths of the remote unit 400. In this regard, the RF antennas 406(1)-406(N) are configured to receive a plurality of modified uplink RF signals 430(1)-430(N), respectively. The phase shifters 412(1)-412(N) are configured to generate a plurality of uplink RF signals 432(1)-432(N) based on the modified uplink RF signals 430(1)-430(N), respectively. The splitter combiner 414 is configured to combine the uplink RF signals 432(1)-432(N) to generate an uplink RF communications signal 434, which may include one or more uplink communications services 436(1)-436(K). The splitter combiner 414 provides the uplink RF communications signal 434 to the duplexer circuit 426. The remote unit 400 may include an analog-to-digital converter (ADC) (not shown) for converting the uplink RF communications signal 434 into an uplink digital communications signal (not shown) before providing the uplink digital communications signal to the central unit.

With continuing reference to FIG. 4, each of the phase shifters 412(1)-412(N) is a three-hundred-sixty-degree (360°) phase shifter that includes a combination of switched line phase shifter(s) and a reflective shifter. An example of the phase shifter 412(1) is illustrated and discussed next with reference to FIGS. 6A-6C as a non-limiting example.

In this regard, FIG. 6A is a schematic diagram providing an exemplary illustration of the phase shifter 412(1) of FIG. 4 that can be provided in the remote unit 400 to generate a 360° phase shift. The phase shifter 412(1) includes a first switched line phase shifter 600, a reflective phase shifter 602, and a second switched line phase shifter 604 disposed in a cascading arrangement. The first switched line phase shifter 600 and the second switched line phase shifter 604 are configured to provide larger phase shifts (e.g., one-hundred-eighty-degree (180°) by the first switched line phase shifter 600 and ninety-degree (90°) by the second switched line phase shifter 604) phase shifts with coarse resolution. The reflective phase shifter 602 is configured to provide a smaller phase shift (e.g., less than 90° phase shift) with fine resolution. As is further discussed later, each of the first switched line phase shifter 600, the reflective phase shifter 602, and the second switched line phase shifter 604 can be digitally controlled (e.g., based on digital words) to generate a desired phase shift.

The first switched line phase shifter 600 is configured to phase-shift the downlink RF signal 418(1) by either zero degrees (0°) or 180° to generate a first intermediate downlink RF signal 606. The reflective phase shifter 602 is configured to phase-shift the first intermediate downlink RF signal 606 between 0° and 90° to generate a second intermediate downlink RF signal 608. The second switched line phase shifter 604 is configured to phase-shift the second intermediate downlink RF signal 608 by 0° or 90° to generate the modified downlink RF signal 408(1). Hence, by cascading the first switched line phase shifter 600, the reflective phase shifter 602, and the second switched line phase shifter 604, the phase shifter 412(1) can phase-shift the downlink RF signal 418(1) (e.g., in increments of three degrees (3°)) up to 360°.

FIG. 6B is a schematic diagram of an exemplary switched line phase shifter 610 that can be provided in the phase shifter 412(1) of FIG. 6A as the first switched line phase shifter 600 and the second switched line phase shifter 604 to provide a larger phase shift with coarse resolution. The switched line phase shifter 610 includes a first two-way switch 612 and a second two-way switch 614, which are controlled by the control circuit 420 of FIG. 4. The switched line phase shifter 610 includes a first switched path 616 configured to provide a 90° or 180° phase shift with coarse resolution. The switched line phase shifter 610 also includes a second switched path 618, which includes a band pass filter 620 that can provide approximately 0° phase shift. In a non-limiting example, the band pass filter 620 has a phase linearity slope across an operation frequency range similar to the operation frequency range of a 90° or a 180° linearity slope. When phases associated with the first switched path 616 and the second switched path 618 are observed, a wide band flat 90° or 180° phase shift is achieved.

FIG. 6C is a schematic diagram of an exemplary reflective phase shifter 622 that can be provided in the phase shifter 412(1) of FIG. 6A as the reflective phase shifter 602 to provide a smaller phase shift with fine resolution. The reflective phase shifter 622 includes a three decibel (3 dB) hybrid coupler 624. The 3 dB hybrid coupler 624 has an input port 626 connected to an input port 628 of the reflective phase shifter 622. The 3 dB hybrid coupler 624 has an output port 630 connected to an output port 632 of the reflective phase shifter 622. The 3 dB hybrid coupler 624 has a coupled port 634 and an isolated port 636 connected to a first switched capacitor 638 and a second switched capacitor 640, respectively. The first intermediate downlink RF signal 606 is divided by two between the coupled port 634 and the isolated port 636 of the 3 dB hybrid coupler 624. An incident wave at the coupled port 634 and the isolated port 636 are reflected back to the first switched capacitor 638 and the second switched capacitor 640 that have approximately zero decibel (0 dB) return loss. The incident wave reflected from the coupled port 634 and the isolated port 636 are combined in-phase at the output port 632. As such, by changing capacitances of the first switched capacitor 638 and the second switched capacitor 640 via the control circuit 420 of FIG. 4, it is possible to control the reflective phase shifter 622 to provide a smaller phase shift with fine resolution. The phase shift resolution of the reflective phase shifter 622 is determined by capacitance resolution of the first switched capacitor 638 and the second switched capacitor 640.

With reference back to FIG. 6A, the first switched line phase shifter 600 is configured to generate either a 0° or a 180° phase shift based on a first control bit 642. In a non-limiting example, the first switched line phase shifter 600 is configured to generate the 0° phase shift when the first control bit 642 is set to zero, and generate the 180° phase shift when the first control bit 642 is set to one. The reflective phase shifter 602 is configured to generate a phase shift between 0° and 90° based on five second control bits 644(1)-644(5). The five second control bits 644(1)-644(5) are able to define thirty-two (between binary value 00000 and 11111) possible phase shift resolutions for the reflective phase shifter 602. In a non-limiting example, the reflective phase shifter 602 generates a forty-five-degree (45°) phase shift when the five second control bits 644(1)-644(5) are set to binary value 01111. The second switched line phase shifter 604 is configured to generate either a 0° or a 90° phase shift based on a third control bit 646. In a non-limiting example, the second switched line phase shifter 604 is configured to generate the 0° phase shift when the third control bit 646 is set to zero (0), and generate the 90° phase shift when the third control bit 646 is set to one. Hence, by changing a combination of the first control bit 642, the five second control bits 644(1)-644(5), and the third control bit 646, it is possible to configure the phase shifter 412(1) to generate a 0° to 360° phase shift. A summary of common combinations of the first control bit 642, the five second control bits 644(1)-644(5), and the third control bit 646 for the phase shifter 412(1) is provided in the table below.

| Total Phase Shift by the Phase Shifter (412(1)) | First Control Bit (642) | Five (5) Second Control Bits (644(1)-644(5)) | Third Control Bit (646) |
|---|---|---|---|
| 0° | 0 | 00000 | 0 |
| 45° | 0 | 01111 | 0 |
| 90° | 0 | 00000 | 1 |
| 135° | 0 | 01111 | 1 |
| 180° | 1 | 00000 | 0 |
| 225° | 1 | 01111 | 0 |
| 270° | 1 | 00000 | 1 |
| 315° | 1 | 01111 | 1 |

The second switched line phase shifter 604 is also configured to phase-shift the modified uplink RF signal 430(1) by 0° or 90° to generate a first intermediate uplink RF signal 648. The reflective phase shifter 602 is configured to phase-shift the first intermediate uplink RF signal 648 between 0° and 90° to generate a second intermediate uplink RF signal 650. The first switched line phase shifter 600 is configured to phase-shift the second intermediate uplink RF signal 650 by either 0° or 180° to generate the uplink RF signal 432(1). Hence, the phase shifter 412(1) can phase-shift the modified uplink RF signal 430(1) (e.g., in increments of three degrees)(3°) up to 360°.

With reference back to FIG. 4, the antenna array 402 can be configured to include any positive integer number of the RF antennas 406(1)-406(N) as appropriate. In one non-limiting example, the antenna array 402 is configured to include nineteen (19) RF antennas 406(1)-406(19). In this regard, the nineteen (19) RF antennas 406(1)-406(19) are configured to transmit nineteen modified downlink RF signals 408(1)-408(19) in the formed radiation beam 422 in the radiation direction 424. The passive beamforming network 410 includes nineteen phase shifters 412(1)-412(19) configured to phase-shift nineteen downlink RF signals 418(1)-418(19) to generate the nineteen modified downlink RF signals 408(1)-408(19) in nineteen phases θ$_1$-θ$_{19}$, respectively. The nineteen phase shifters 412(1)-412(19) are functionally equivalent to the phase shifters 412(1)-412(N). The control circuit 420 is configured to determine the nineteen phases θ$_1$-θ$_{19}$ to cause the nineteen RF antennas 406(1)-406(19) to transmit the nineteen (19) modified downlink RF signals 408(1)-408(19) in the formed radiation beam 422 in the radiation direction 424. The control circuit 420 controls the nineteen phase shifters 412(1)-412(19) to generate the nineteen modified downlink RF signals 408(1)-408(19) in the nineteen phases θ$_1$-θ$_{19}$, respectively. The remote unit 400 also includes a one-to-nineteen (1:19) splitter combiner 414', which is functionally equivalent to the splitter combiner 414, configured to split the downlink RF communications signal 416 into the nineteen downlink RF signals 418(1)-418(19). The 1:19 splitter combiner 414' provides the nineteen downlink RF signals 418(1)-418(19) to the phase shifters 412(1)-412(19). Aspects related to supporting antenna array beamforming using the nineteen RF antennas 406(1)-406(19) in the remote unit 400 are discussed next with references to FIGS. 7 and 8.

Figure 7:
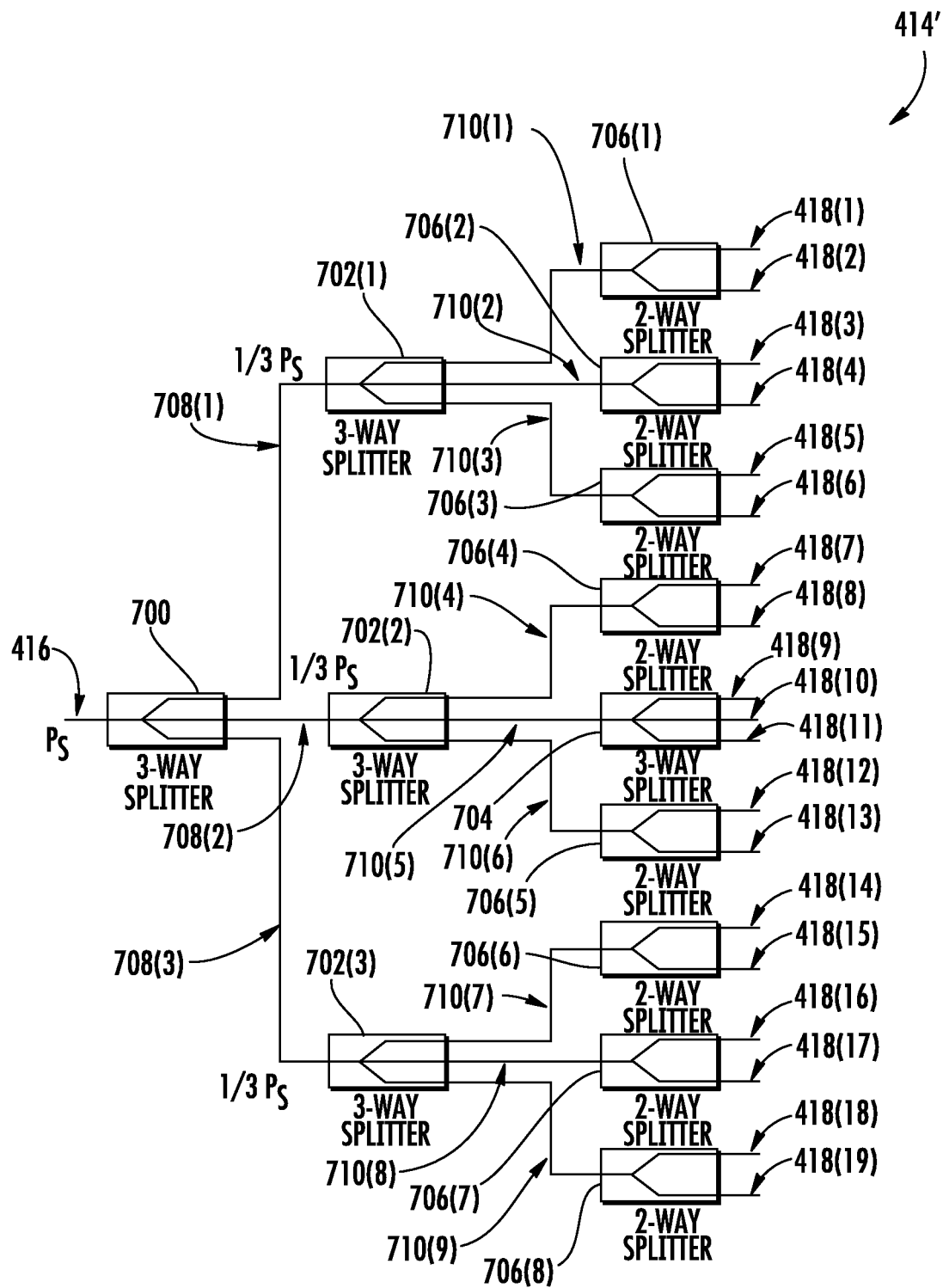
FIG. 7 is a schematic diagram providing an exemplary illustration of a one-to-nineteen (1:19) splitter combiner configured to split a downlink RF communications signal into nineteen (19) downlink RF signals.

In this regard, FIG. 7 is a schematic diagram providing an exemplary illustration of the 1:19 splitter combiner 414' of FIG. 4 to split the downlink RF communications signal 416 into the nineteen downlink RF signals 418(1)-418(19). With reference to FIG. 7, the 1:19 splitter combiner 414' includes a first three-way splitter 700, three second three-way splitters 702(1)-702(3), a third three-way splitter 704, and eight two-way splitters 706(1)-706(8) disposed in a cascading arrangement. The first three-way splitter 700 receives the downlink RF communications signal 416 having the determined power level $P_S$. The first three-way splitter 700 splits the downlink RF communications signal 416 to generate three first downlink RF signals 708(1)-708(3), each having approximately one-third of the determined power level $P_S$ (⅓ $P_S$). The three second three-way splitters 702(1)-702(3) receive the first downlink RF signals 708(1)-708(3), respectively. The three second three-way splitters 702(1)-702(3) split the first downlink RF signals 708(1)-708(3) to generate nine (9) second downlink RF signals 710(1)-710(9), each having one-ninth of the determined power level $P_S$ (⅑ $P_S$). The third three-way splitter 704 receives and splits the second downlink RF signal 710(5) to generate the downlink RF signals 418(9)-418(11), each having one-twenty-seventh of the determined power level $P_S$ (1/27 $P_S$). The eight two-way splitters 706(1)-706(8) receive and split the second downlink RF signals 710(1)-710(4), 710(6)-710(9) to generate sixteen downlink RF signals 418(1)-418(8), 418(12)-418(19), each having one-eighteenth of the determined power level $P_S$ (1/18 $P_S$).

As a result, the sixteen downlink RF signals 418(1)-418(8), 418(12)-418(19) among the nineteen downlink RF signals 418(1)-418(19) each have 1/18 $P_S$, while the three downlink RF signals 418(9)-418(11) among the nineteen downlink RF signals 418(1)-418(19) each have 1/27 $P_S$. Understandably, the power inequality among the nineteen downlink RF signals 418(1)-418(19) can result in similar power inequality among the nineteen modified downlink RF signals 408(1)-408(19). As such, it is necessary to properly arrange the nineteen RF antennas 406(1)-406(19) in the antenna array 402 to mitigate potential impact of the power inequality on RF performance of the antenna array 402.

Figure 8:
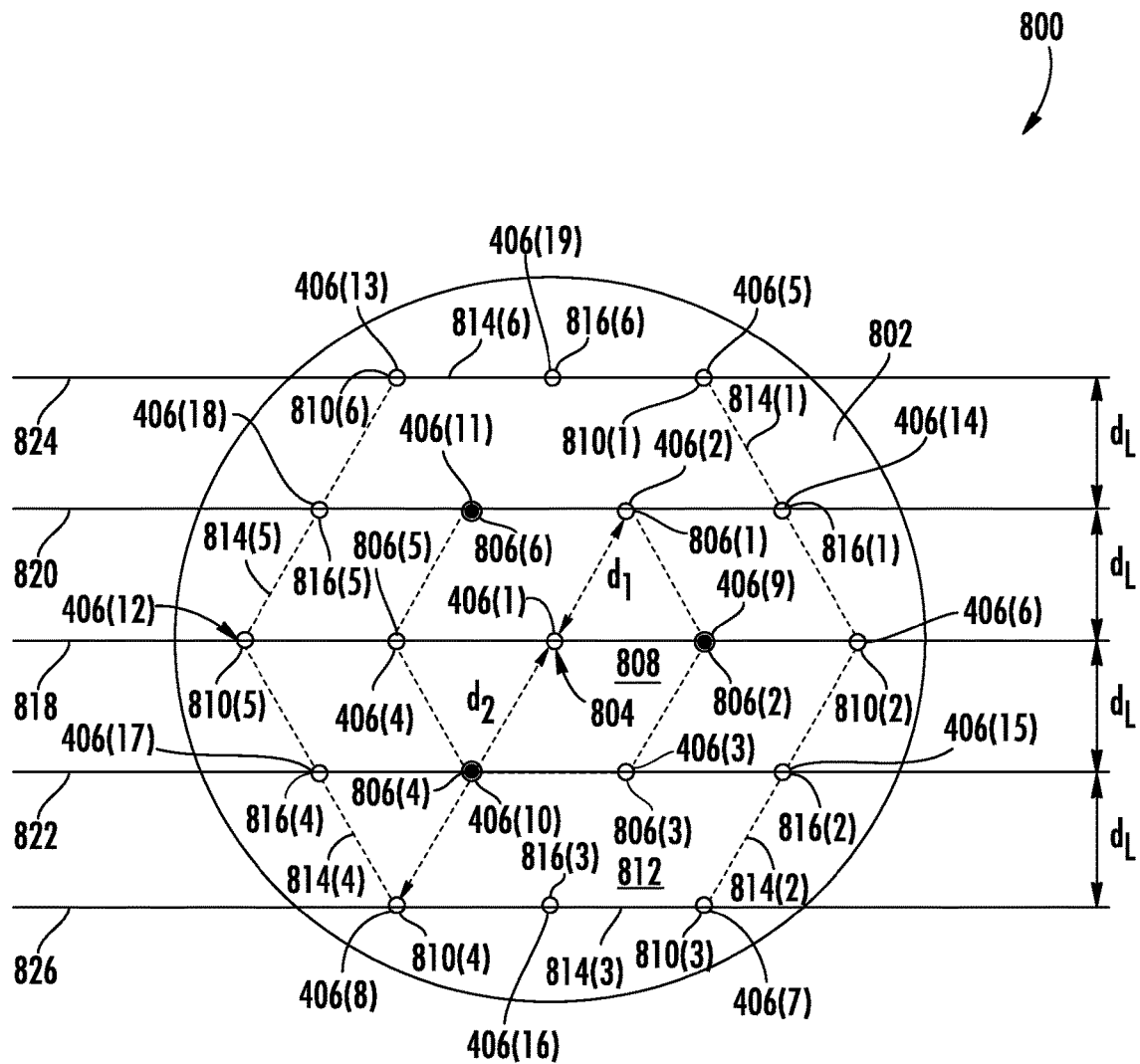
FIG. 8 is a schematic diagram of an exemplary antenna array including nineteen (19) RF antennas disposed in a circular-shaped area.

In this regard, FIG. 8 is a schematic diagram providing an exemplary circular-shaped arrangement 800 of the nineteen RF antennas 406(1)-406(19) of FIG. 4. According to FIG. 8, the nineteen RF antennas 406(1)-406(19) are disposed in a circular-shaped area 802 having a center point 804. It shall be appreciated that the circular-shaped arrangement 800 is one of many possible arrangements for the nineteen RF antennas 406(1)-406(19) and thus shall not be considered as being limiting. In fact, it may be possible to dispose the nineteen RF antennas 406(1)-406(19) according to other geometrical shapes, such as a triangle, rectangle, pentagon, hexagon, and so on.

With reference to FIG. 8, one first selected RF antenna among the nineteen RF antennas 406(1)-406(19) is disposed at the center point 804 of the circular-shaped area 802. In a non-limiting example, the RF antenna 406(1) is selected to be disposed at the center point 804 of the circular-shaped area 802. The RF antenna 406(1) is configured to transmit the modified downlink RF signal 408(1) having $\frac{1}{18}$ $P_S$.

Next, six second selected RF antennas among the nineteen RF antennas 406(1)-406(19) are disposed respectively at six first vertices 806(1)-806(6) of a first regular hexagon 808. According to the same non-limiting example above, the RF antennas 406(2)-406(4) and the RF antennas 406(9)-406(11) are selected to be disposed at the six first vertices 806(1)-806(6). The RF antennas 406(2)-406(4), which are configured to transmit the modified downlink RF signals 408(2)-408(4) each having $\frac{1}{18}$ $P_S$, are disposed at the first vertices 806(1), 806(3), and 806(5), respectively. The RF antennas 406(9)-406(11), which are configured to transmit the modified downlink RF signals 408(9)-408(11) each having $\frac{1}{27}$ $P_S$, are disposed at the first vertices 806(2), 806(4), and 806(6), respectively. The first regular hexagon 808 has a first radius $d_1$ extending from the center point 804 of the circular-shaped area 802. In this regard, the first regular hexagon 808 is also centered at the center point 804 of the circular-shaped area 802.

With continuing reference to FIG. 8, six third selected RF antennas among the nineteen RF antennas 406(1)-406(19) are disposed respectively at six second vertices 810(1)-810(6) of a second regular hexagon 812. According to the same non-limiting example above, the RF antennas 406(5)-406(8) and the RF antennas 406(12), 406(13) are selected to be disposed at the six second vertices 810(1)-810(6), respectively. The RF antennas 406(5)-406(8) are configured to transmit the modified downlink RF signals 408(5)-408(8) each having $\frac{1}{18}$ $P_S$. The RF antennas 406(12), 406(13) are configured to transmit the modified downlink RF signals 408(12), 408(13) each having $\frac{1}{18}$ $P_S$. The second regular hexagon 812 has a second radius $d_2$ extending from the center point 804 of the circular-shaped area 802. In this regard, the second regular hexagon 812 is also centered at the center point 804 of the circular-shaped area 802.

The second regular hexagon 812 has six sides 814(1)-814(6) having six respective midpoints 816(1)-816(6). Six fourth selected RF antennas among the nineteen RF antennas 406(1)-406(19) are disposed at six respective midpoints 816(1)-816(6) of the six sides 814(1)-814(6). According to the same non-limiting example above, the RF antennas 406(14)-406(19) are selected to be disposed at the six respective midpoints 816(1)-816(6). The RF antennas 406(14)-406(19) are configured to transmit the modified downlink RF signals 408(14)-408(19) each having $\frac{1}{18}$ $P_S$.

The second radius $d_2$ of the second regular hexagon 812 equals two times the first radius $d_1$ of the first regular hexagon 808 ($d_2=2d_1$). In this regard, each of the nineteen RF antennas 406(1)-106(19) in the antenna array 402 is separated from respective neighboring RF antennas by the first radius $d_1$. In a non-limiting example, the nineteen RF antennas 406(1)-406(19) are configured to transmit the nineteen modified downlink RF signals 408(1)-408(19) in the predetermined RF band. To help reduce RF interference among the nineteen RF antennas 406(1)-406(19) in the antenna array 402, the first radius $d_1$ is configured to be one-half of a wavelength of the center frequency of the predetermined RF band. If the predetermined RF band occupies the RF spectrum between 1710 MHz and 2180 MHz, the center frequency of the predetermined RF band will be 1910 MHz. Accordingly, the first radius $d_1$ needs to be approximately six point five centimeters (6.5 cm). As such, the circular-shaped area 802 may be configured to have a diameter of approximately thirty centimeters (30 cm).

With continuing reference to FIG. 8, the RF antennas 406(1)-406(N) of FIG. 4 can be disposed in the circular-shaped area 802 based on a tiered arrangement, which is discussed and illustrated next with reference to the nineteen RF antennas 406(1)-406(19). It shall be appreciated that the tired arrangement can be generalized to be applicable to any number of RF antennas.

In this regard, X first RF antennas 406(12), 406(4), 406(1), 406(9), and 406(6), wherein X is a positive non-zero integer number, selected from among the nineteen RF antennas 406(1)-406(19) are disposed uniformly on a first line 818 that crosses the center point 804 of the circular-shaped area 802. Each of the X first RF antennas 406(12), 406(4), 406(1), 406(9), and 406(6) is separated from an immediately adjacent first RF antenna by the first radius $d_1$ (the first radius $d_1$ being a predetermined distance). X−1 second RF antennas 406(18), 406(11), 406(2), and 406(14) selected from among the nineteen RF antennas 406(1)-406(19) are disposed uniformly on a second line 820 located immediately adjacent to the first line 818 and separated from the first line 818 by a line separation distance $d_L$. Each of the X−1 second RF antennas 406(18), 406(11), 406(2), and 406(14) is separated from an immediately adjacent second RF antenna by the first radius $d_1$. X−1 third RF antennas 406(17), 406(10), 406(3), and 406(15) selected from among the nineteen RF antennas 406(1)-406(19) are disposed uniformly on a third line 822 located immediately adjacent to the first line 818 and separated from the first line 818 by the line separation distance $d_L$. Each of the X−1 third RF antennas 406(17), 406(10), 406(3), and 406(15) is separated from an immediately adjacent third RF antenna by the first radius $d_1$. X−2 fourth RF antennas 406(13), 406(19), and 406(5) selected from among the nineteen RF antennas 406(1)-406(19) are disposed uniformly on a fourth line 824 located immediately adjacent to the second line 820 and separated from the second line 820 by the line separation distance $d_L$. Each of the X−2 fourth RF antennas 406(13), 406(19), and 406(5) is separated from an immediately adjacent fourth RF antenna by the first radius $d_1$. X−2 fifth RF antennas 406(8), 406(16), and 406(7) selected from among the nineteen RF antennas 406(1)-406(19) are disposed uniformly on a fifth line 826 located immediately adjacent to the third line 822 and separated from the third line 822 by the line separation distance $d_L$. Each of the X−2 fifth RF antennas 406(8), 406(16), and 406(7) is separated from an immediately adjacent fifth RF antenna by the first radius $d_1$.

With reference back to FIG. 4, when the antenna array 402 is configured to include the nineteen RF antennas 406(1)-406(19), the passive beamforming network 410 will include the 1:19 splitter combiner 414' and the nineteen phase shifters 412(1)-412(19). In this regard, in a non-limiting example, insertion loss associated with the 1:19 splitter combiner 414' can cause approximately a twelve point eight decibel (12.8 dB), which equals approximately ten logarithm nineteen (10 log(19)), loss of the determined power level $P_S$ of the downlink RF communications signal 416. In addition, insertion loss associated with the nineteen phase shifters 412(1)-412(19) can also cause approximately a three decibel (3 dB) loss of the determined power level $P_S$. However, the nineteen RF antennas 406(1)-406(19) in the antenna array 402 are capable of generating approximately a twenty-five point six decibel (25.6 dB), which equals approximately twenty logarithm nineteen (20 log(19)), gain in the formed radiation beam 422. As a result, the remote unit 400 may have approximately an eight decibel (8 dB) gain despite the losses caused by the 1:19 splitter combiner 414' and the nineteen phase shifters 412(1)-412(19).

In a non-limiting example, the remote unit 400 is mounted on a ceiling of a building with a twenty-five-degree (25°) downward tilt. As such, a portion of the formed radiation beam 422 may be reflected by a physical object(s) (e.g., a floor) in the building. In this regard, FIG. 9 is a schematic diagram of an exemplary elevation pattern 900 of the formed radiation beam 422 when the remote unit 400 of FIG. 4 is mounted on a ceiling of a building.

Figure 9:
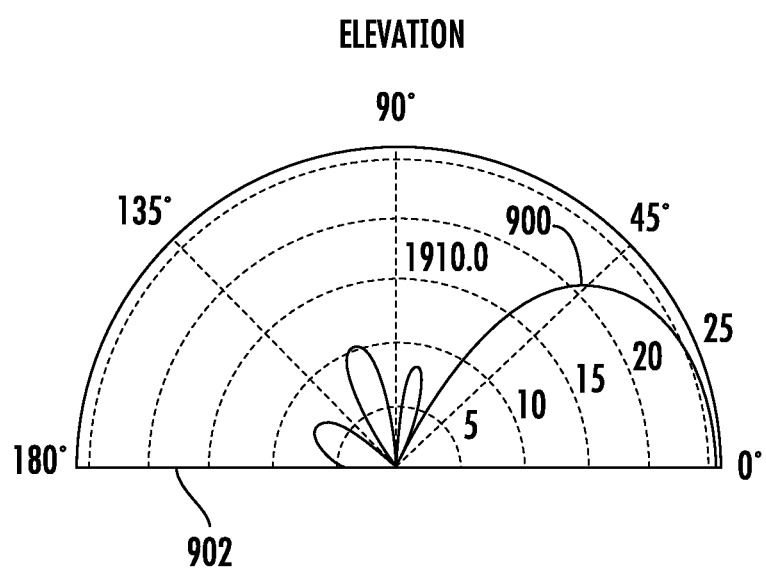
FIG. 9 is a schematic diagram of an exemplary elevation pattern of a formed radiation beam when the remote unit of FIG. 4 is mounted on a ceiling of a building.

With reference to FIG. 9, the elevation pattern 900 of the formed radiation beam 422 is flipped along a horizontal axis 902 when the remote unit 400 is mounted on the ceiling and the RF antennas 406(1)-406(N) are tilted downward. Further, the elevation pattern 900 needs to be weighted with respect to an inherent pattern of a monopole antenna. In a non-limiting example, the elevation pattern 900 closely resembles an overall pattern of the formed radiation beam 422 for transmitting the modified downlink RF signals 408(1)-408(N) in the RF spectrum between 1710 MHz and 2180 MHz.

Figure 10:
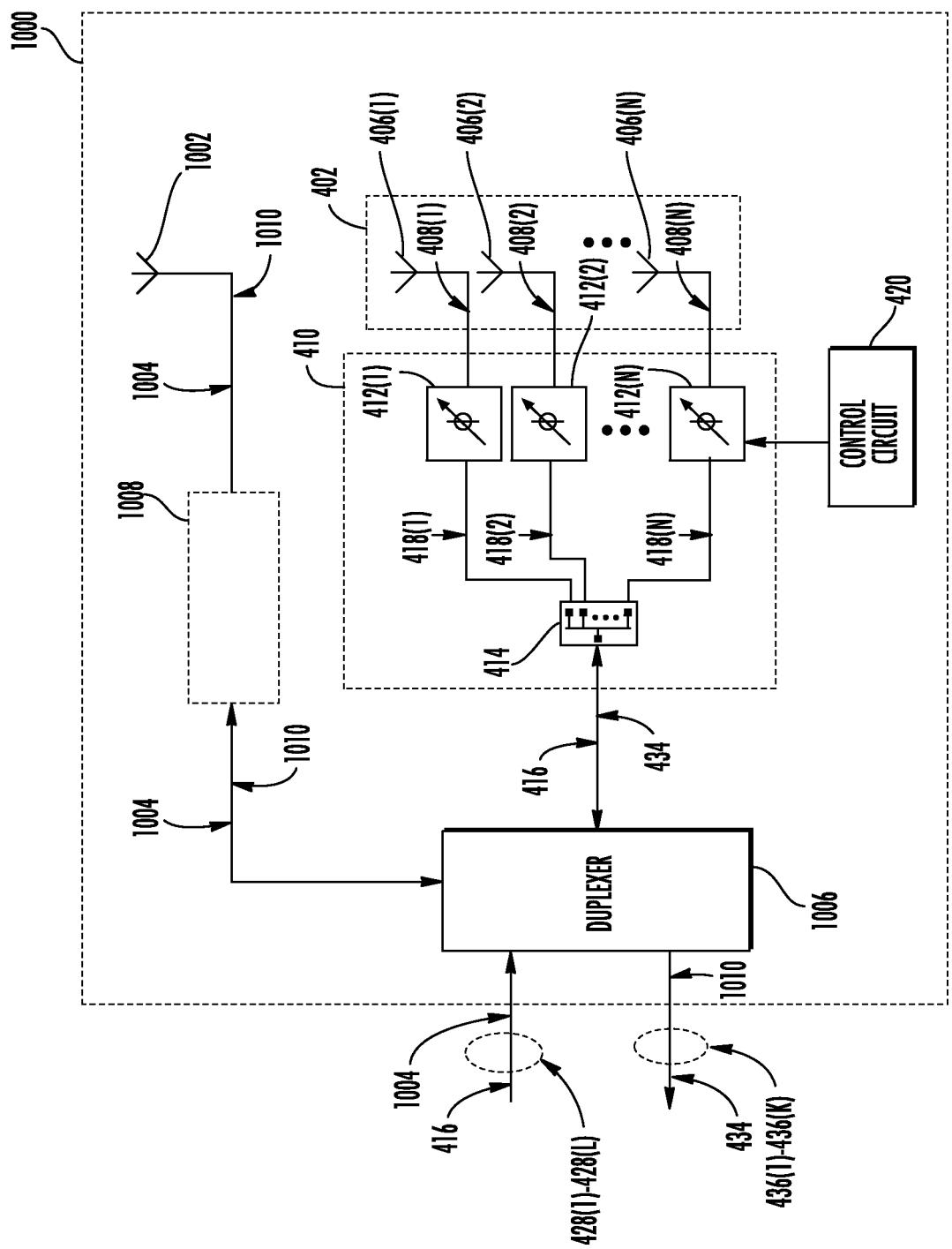
FIG. 10 is a schematic diagram of an exemplary remote unit including the antenna array of FIG. 4 for supporting antenna array beamforming in a higher frequency band and a second RF antenna for transmitting a second downlink RF communications signal in a lower frequency band.

With reference back to FIG. 4, the remote unit 400 can be configured to support antenna array beamforming in a higher frequency band (e.g., the 1710 MHz to 2180 MHz band), while concurrently supporting transmissions in a lower frequency band (e.g., 700 MHz band or 850 MHz band). In this regard, FIG. 10 is a schematic diagram of an exemplary remote unit 1000 including the antenna array 402 of FIG. 4 for supporting antenna array beamforming in a higher frequency band, and a second RF antenna 1002 for transmitting a second downlink RF communications signal 1004 in a lower frequency band. Common elements between FIGS. 4 and 10 are shown therein with common element numbers and will not be re-described herein.

With reference to FIG. 10, in a non-limiting example, the second RF antenna 1002 is an omnidirectional antenna (e.g., a monopole antenna). The remote unit 1000 includes a duplexer circuit 1006 configured to receive the downlink RF communications signal 416 and the second downlink RF communications signal 1004. The duplexer circuit 1006 provides the downlink RF communications signal 416 to the passive beamforming network 410 and the antenna array 402 for transmission over the predetermined RF band (e.g., the 1710 MHz to 2180 MHz band). The duplexer circuit 1006 also provides the second downlink RF communications signal 1004 to signal processing circuitry 1008. The signal processing circuitry 1008 in turn provides the second downlink RF communications signal 1004 to the second RF antenna 1002 for transmission in a second predetermined RF band (e.g., the 700 MHz band or the 850 MHz band). In this regard, the second predetermined RF band occupies a lower frequency spectrum than the predetermined RF band. The second RF antenna 1002 is also configured to receive a second uplink RF communications signal 1010. The signal processing circuitry 1008 in turn provides the second uplink RF communications signal 1010 to the duplexer circuit 1006.

Figure 11A:
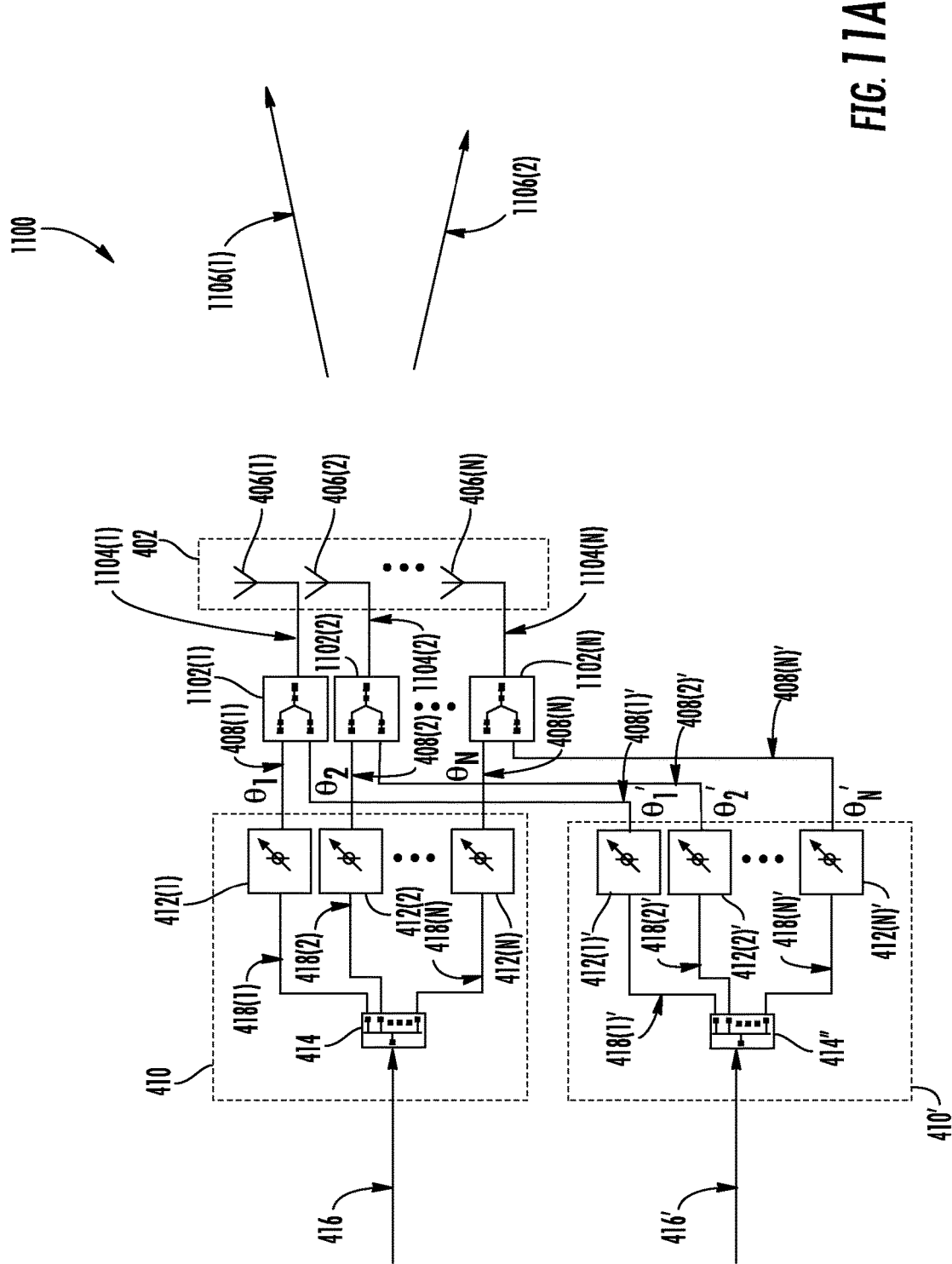
FIG. 11A is a schematic diagram of an exemplary remote unit configured to support concurrent multiple-input multiple-output (MIMO) and antenna array beamforming operations.

The remote unit 400 of FIG. 4 may be adapted to concurrently support multiple-input multiple-output (MIMO) and antenna array beamforming. In this regard, FIG. 11A is a schematic diagram of an exemplary remote unit 1100 configured to support concurrent MIMO and antenna array beamforming operations. Common elements between FIGS. 4 and 11A are shown therein with common element numbers and will not be re-described herein.

With reference to FIG. 11A, the remote unit 1100 includes a second passive beamforming network 410'. The second passive beamforming network 410' includes a second splitter combiner 414", which is functionally equivalent to the splitter combiner 414. The second passive beamforming network 410' also includes a plurality of second phase shifters 412(1)'-412(N)'. The second phase shifters 412(1)'-412(N)' are functionally equivalent to the phase shifters 412(1)-412(N), respectively.

The second splitter combiner 414" is configured to split a second downlink RF communications signal 416' into a plurality of second downlink RF signals 418(1)'-418(N)'. The second splitter combiner 414" is configured to provide the second downlink RF signals 418(1)'-418(N)' to the second phase shifters 412(1)'-412(N)', respectively. The second phase shifters 412(1)'-412(N)' are configured to phase-shift the second downlink RF signals 418(1)'-418(N)' to generate a plurality of second modified downlink RF signals 408(1)'-408(N)' in a plurality of second phases $\theta_1'$-$\theta_N'$, respectively.

The remote unit 1100 includes a plurality of MIMO splitter combiners 1102(1)-1102(N). The MIMO splitter combiners 1102(1)-1102(N) are configured to receive the modified downlink RF signals 408(1)-408(N) from the phase shifters 412(1)-412(N), respectively. The MIMO splitter combiners 1102(1)-1102(N) are configured to receive the second modified downlink RF signals 408(1)'-408(N)' from the second phase shifters 412(1)'-412(N)', respectively. The MIMO splitter combiners 1102(1)-1102(N) are further configured to generate a plurality of downlink MIMO signals 1104(1)-1104(N) based on the modified downlink RF signals 408(1)-408(N) and the second modified downlink RF signals 408(1)'-408(N)', respectively. For example, the MIMO splitter combiner 1102(1) generates the downlink MIMO signal 1104(1) by combining the modified downlink RF signal 408(1) and the second modified downlink RF signal 408(1)'. Likewise, the MIMO splitter combiner 1102(2) generates the downlink MIMO signal 1104(2) by combining the modified downlink RF signal 408(2) and the second modified downlink RF signal 408(2)', and so on. The MIMO splitter combiners 1102(1)-1102(N) further provide the downlink MIMO signals 1104(1)-1104(N) to the RF antennas 406(1)-406(N), respectively.

Figure 11B:
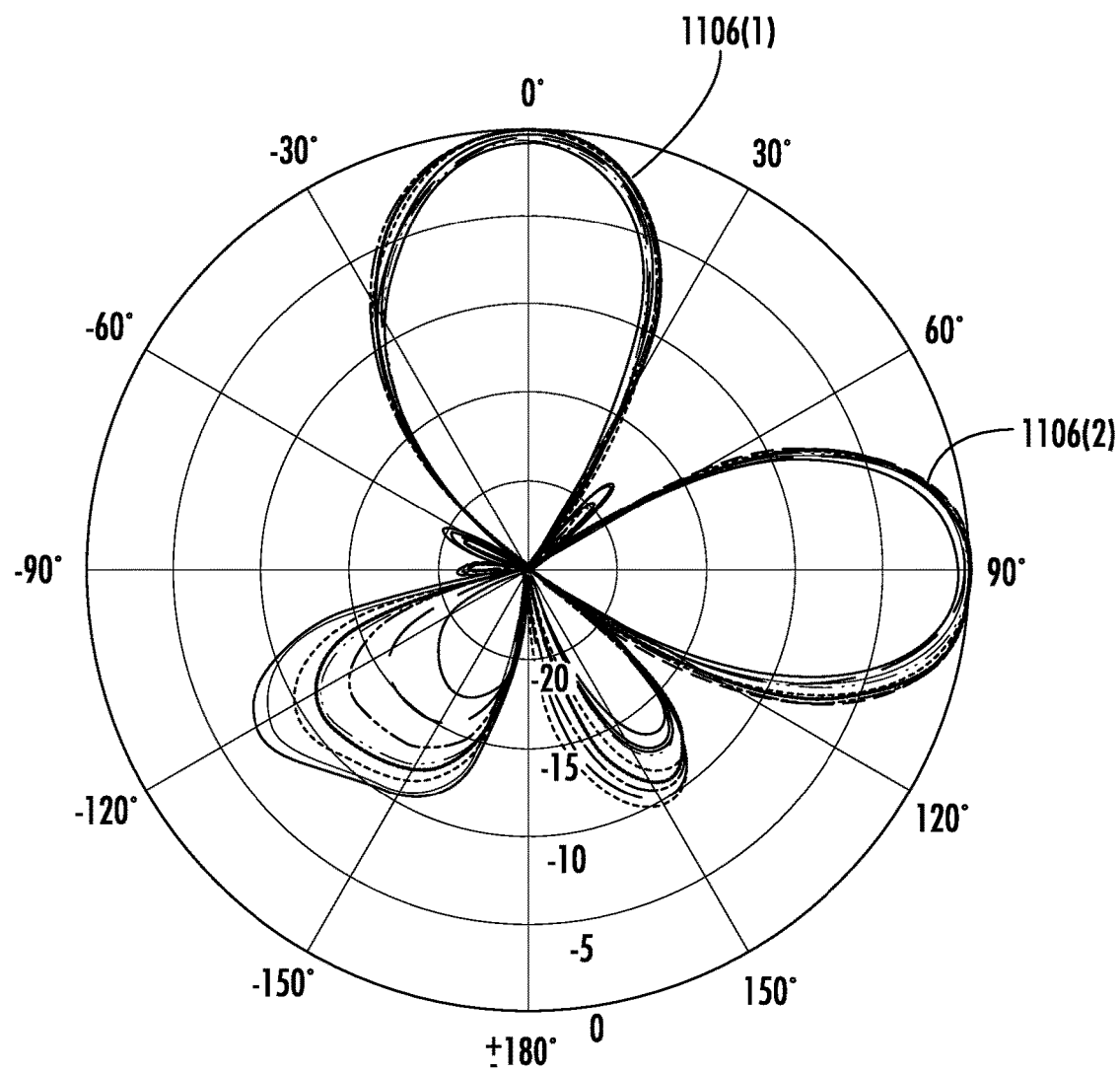
FIG. 11B is a schematic diagram providing an exemplary illustration of a first formed radiation beam and a second formed radiation beam transmitted from an antenna array in the remote unit of FIG. 11A.

The control circuit 420 (not shown) determines the phases $\theta_1$-$\theta_N$ and the second phases $\theta_1'$-$\theta_N'$ to cause the antenna array 402 to transmit a first formed radiation beam 1106(1) and a second formed radiation beam 1106(2). FIG. 11B is a schematic diagram providing an exemplary illustration of the first formed radiation beam 1106(1) and the second formed radiation beam 1106(2) transmitted from the antenna array 402 in the remote unit 1100 of FIG. 11A.

Figure 12:
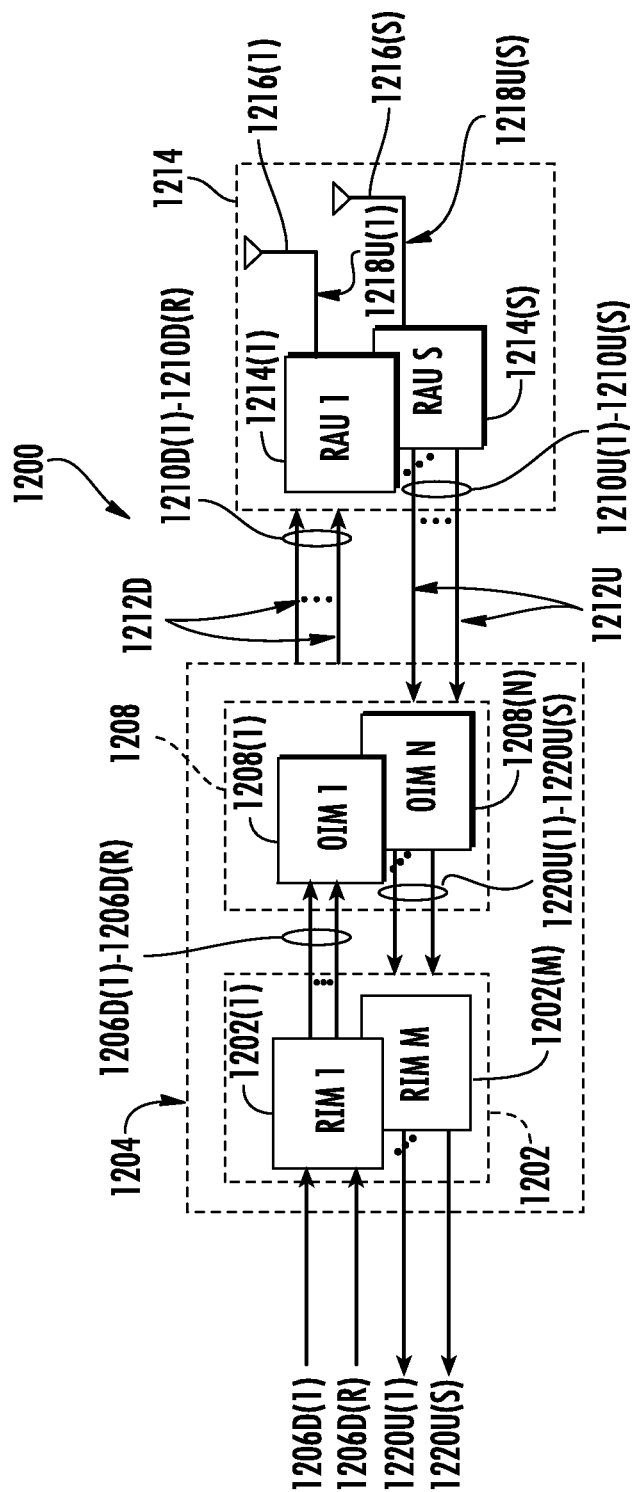
FIG. 12 is a schematic diagram of an exemplary WDS provided in the form of a distributed antenna system (DAS) that can include one or more remote units that support antenna array beamforming, including but not limited to the remote units of FIGS. 4, 10, and 11A.

FIG. 12 is a schematic diagram of an exemplary WDS 1200 provided in the form of a distributed antenna system (DAS) that includes one or more remote units that support antenna array beamforming, including but not limited to the remote unit 400 of FIG. 4, the remote unit 1000 of FIG. 10, and the remote unit 1100 of FIG. 11A. The WDS 1200 may be an optical fiber-based WDS that includes an optical fiber for distributing communications services for multiple frequency bands. Otherwise, the WDS 1200 may include an electrical link for distributing communications services for multiple frequency bands. The WDS 1200 in this example is comprised of three main components. One or more radio interfaces provided in the form of radio interface modules (RIMs) 1202(1)-1202(M) are provided in a head-end unit (HEU) 1204 to receive and process downlink electrical communications signals 1206D(1)-1206D(R) prior to optical conversion into downlink optical fiber-based communications signals. The downlink electrical communications signals 1206D(1)-1206D(R) may be received from a base station (not shown) as an example. The RIMs 1202(1)-1202(M) provide both downlink and uplink interfaces for signal processing. The notations "1-R" and "1-M" indicate that any number of the referenced component, 1-R and 1-M, respectively, may be provided. The HEU 1204 is configured to accept the RIMs 1202(1)-1202(M) as modular components that can easily be installed and removed or replaced in the HEU 1204. In one example, the HEU 1204 is configured to support up to twelve (12) RIMs 1202(1)-1202(12). Each RIM 1202(1)-1202(M) can be designed to support a particular type of radio source or range of radio sources (i.e., frequencies) to provide flexibility in configuring the HEU 1204 and the WDS 1200 to support the desired radio sources.

For example, one RIM 1202 may be configured to support the Personalized Communications System (PCS) radio band. Another RIM 1202 may be configured to support the 800 megahertz (MHz) radio band. In this example, by inclusion of the RIMs 1202(1)-1202(M), the HEU 1204 could be configured to support and distribute communications signals on both PCS and Long-Term Evolution (LTE) 700 radio bands, as an example. The RIMs 1202(1)-1202(M) may be provided in the HEU 1204 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 1202(1)-1202(M) may also be provided in the HEU 1204 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 1202(1)-1202(M) may be provided in the HEU 1204 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 12, when the WDS 1200 is the optical fiber-based WDS, the downlink electrical communications signals 1206D(1)-1206D(R) are provided to a plurality of optical interfaces provided in the form of optical interface modules (OIMs) 1208(1)-1208(N) in this embodiment to convert the downlink electrical communications signals 1206D(1)-1206D(R) into downlink optical fiber-based communications signals 1210D(1)-1210D(R). The notation "1-N" indicates that any number of the referenced component 1-N may be provided. The OIMs 1208(1)-1208(N) may be configured to provide one or more optical interface components (OICs) that contain optical-to-electrical (O/E) and electrical-to-optical (E/O) converters, as will be described in more detail below. The OIMs 1208(1)-1208(N) support the radio bands that can be provided by the RIMs 1202(1)-1202(M), including the examples previously described above.

The OIMs 1208(1)-1208(N) each include E/O converters to convert the downlink electrical communications signals 1206D(1)-1206D(R) into the downlink optical fiber-based communications signals 1210D(1)-1210D(R). The downlink optical fiber-based communications signals 1210D(1)-1210D(R) are communicated over a downlink optical fiber-based communications medium 1212D to a plurality of remote units 1214(1)-1214(S). At least one remote unit among the remote units 1214(1)-1214(S) is provided as the remote unit 400 of FIG. 4, the remote unit 1000 of FIG. 10, or the remote unit 1100 of FIG. 11A for supporting antenna array beamforming. The notation "1-S" indicates that any number of the referenced component 1-S may be provided. Remote O/E converters provided in the remote units 1214(1)-1214(S) convert the downlink optical fiber-based communications signals 1210D(1)-1210D(R) back into the downlink electrical communications signals 1206D(1)-1206D(R), which are provided to antennas 1216(1)-1216(S) in the remote units 1214(1)-1214(S) to client devices in the reception range of the antennas 1216(1)-1216(S).

Remote unit E/O converters are also provided in the remote units 1214(1)-1214(S) to convert uplink electrical communications signals 1218U(1)-1218U(S) received from the client devices through the antennas 1216(1)-1216(S) into uplink optical fiber-based communications signals 1210U(1)-1210U(S). The remote units 1214(1)-1214(S) communicate the uplink optical fiber-based communications signals 1210U(1)-1210U(S) over an uplink optical fiber-based communications medium 1212U to the OIMs 1208(1)-1208(N) in the HEU 1204. The OIMs 1208(1)-1208(N) include O/E converters that convert the received uplink optical fiber-based communications signals 1210U(1)-1210U(S) into uplink electrical communications signals 1220U(1)-1220U(S), which are processed by the RIMs 1202(1)-1202(M) and provided as the uplink electrical communications signals 1220U(1)-1220U(S). The HEU 1204 may provide the uplink electrical communications signals 1220U(1)-1220U(S) to a base station or other communications system.

Note that the downlink optical fiber-based communications medium 1212D and the uplink optical fiber-based communications medium 1212U connected to each remote unit 1214(1)-1214(S) may be a common optical fiber-based communications medium, wherein for example, wave division multiplexing (WDM) is employed to provide the downlink optical fiber-based communications signals 1210D(1)-1210D(R) and the uplink optical fiber-based communications signals 1210U(1)-1210U(S) on the same optical fiber-based communications medium.

Figure 13:
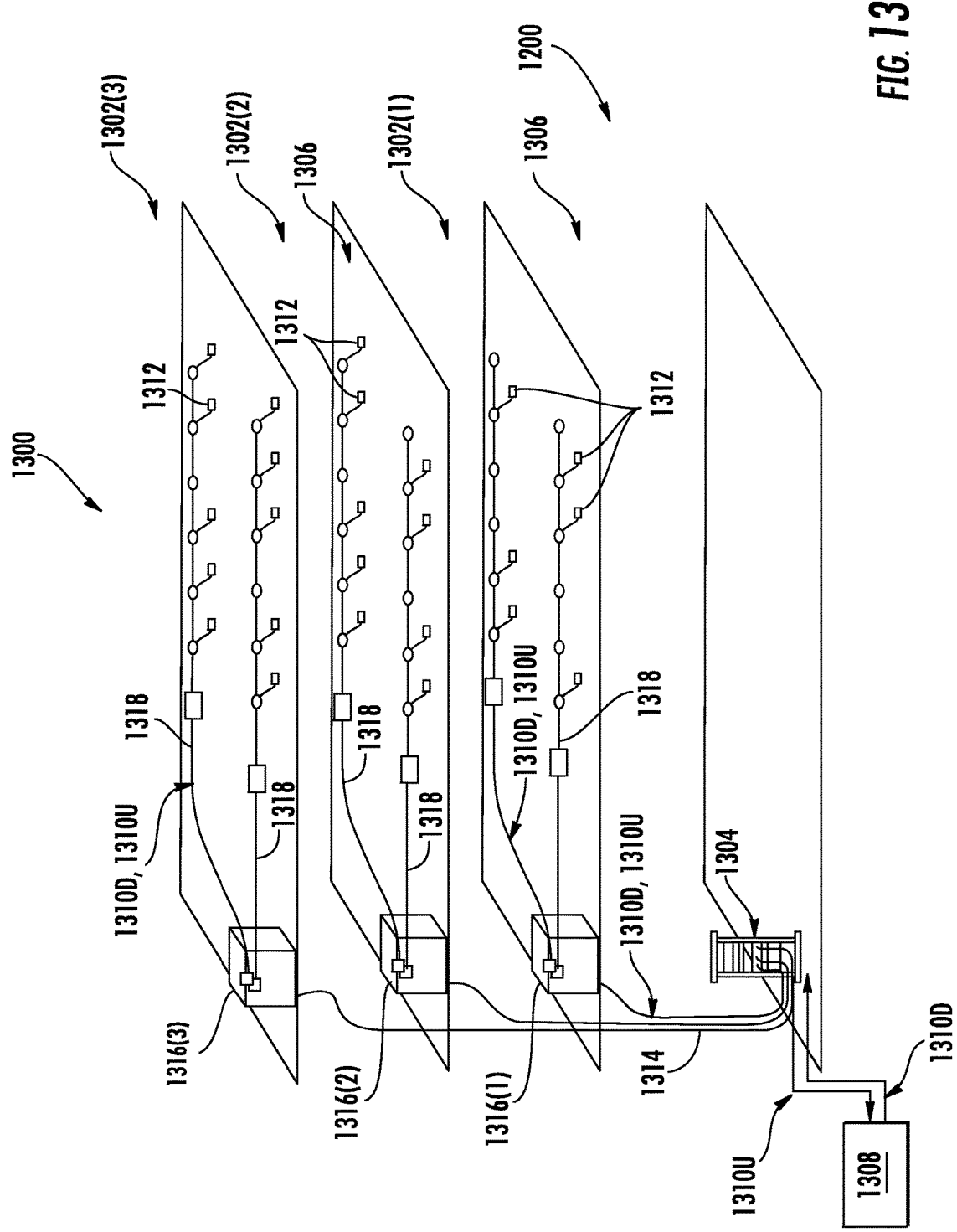
FIG. 13 is a partial schematic cut-away diagram of an exemplary building infrastructure in which the WDS of FIG. 12 can be provided.

The WDS 1200 of FIG. 12 may be provided in an indoor environment, as illustrated in FIG. 13. FIG. 13 is a partial schematic cut-away diagram of an exemplary building infrastructure 1300 in which the WDS 1200 of FIG. 12 can be employed. The building infrastructure 1300 in this embodiment includes a first (ground) floor 1302(1), a second floor 1302(2), and a third floor 1302(3). The floors 1302(1)-1302

(3) are serviced by an HEU 1304 to provide antenna coverage areas 1306 in the building infrastructure 1300. The HEU 1304 is communicatively coupled to a base station 1308 to receive downlink communications signals 1310D from the base station 1308. The HEU 1304 is communicatively coupled to a plurality of remote units 1312 to distribute the downlink communications signals 1310D to the remote units 1312 and to receive uplink communications signals 1310U from the remote units 1312, as previously discussed above. The downlink communications signals 1310D and the uplink communications signals 1310U communicated between the HEU 1304 and the remote units 1312 are carried over a riser cable 1314. The riser cable 1314 may be routed through interconnect units (ICUs) 1316(1)-1316(3) dedicated to each of the floors 1302(1)-1302(3) that route the downlink communications signals 1310D and the uplink communications signals 1310U to the remote units 1312 and also provide power to the remote units 1312 via array cables 1318.

Figure 14:
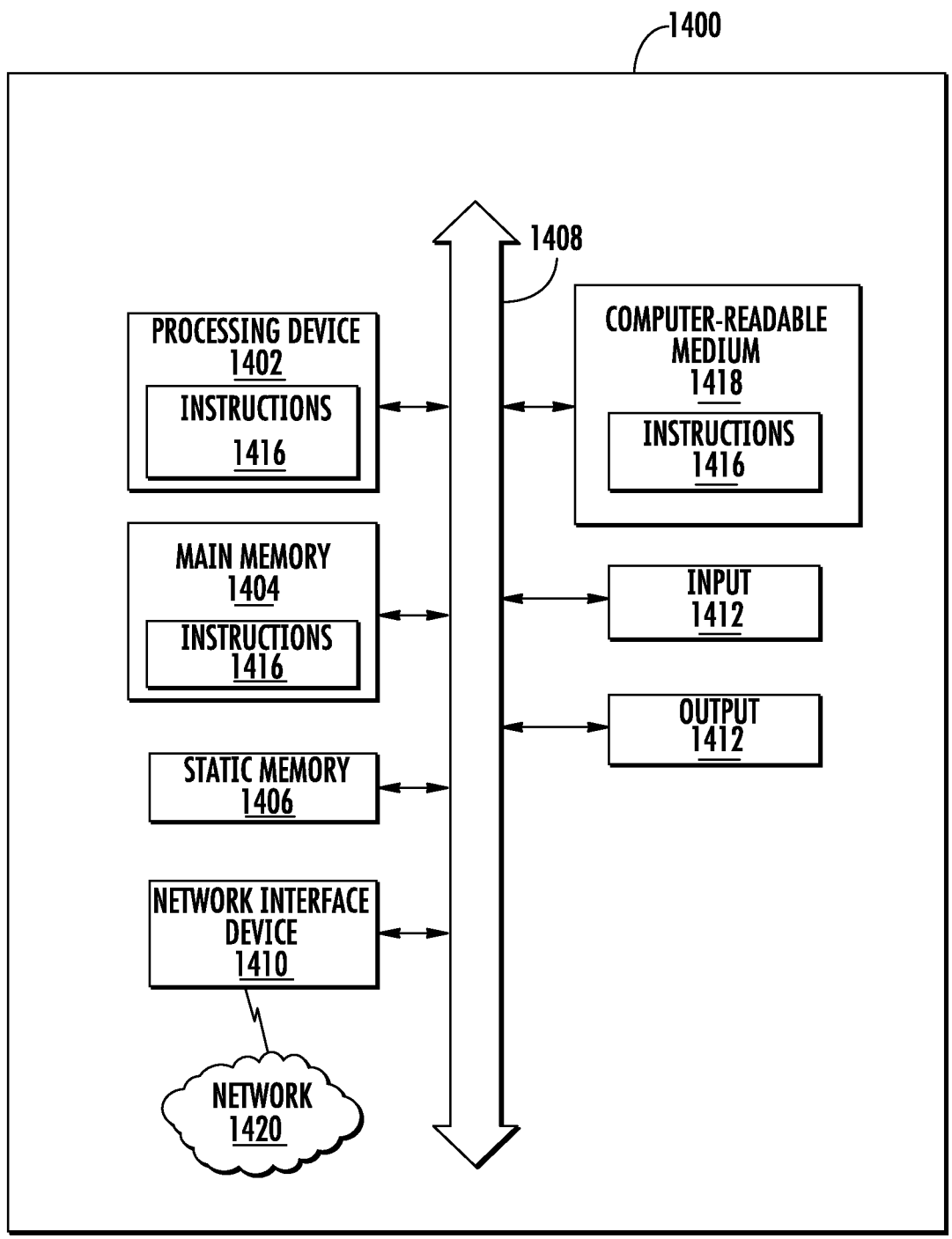
FIG. 14 is a schematic diagram representation of additional detail illustrating an exemplary computer system that could be employed in a control circuit, including a control circuit in the remote units of FIGS. 4 and 10 for instructing the passive beamforming network to support antenna array beamforming.

FIG. 14 is a schematic diagram representation of additional detail illustrating an exemplary computer system 1400 that could be employed in a control circuit, including the control circuit 420 in the remote unit 400 of FIG. 4 and the remote unit 1000 of FIG. 10 for controlling the passive beamforming network 410 in the remote unit 400 to support antenna array beamforming. In this regard, the computer system 1400 is adapted to execute instructions from an exemplary computer-readable medium to perform these and/or any of the functions or processing described herein.

In this regard, the computer system 1400 in FIG. 14 may include a set of instructions that may be executed to predict frequency interference to avoid or reduce interference in a multi-frequency DAS. The computer system 1400 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1400 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1400 in this embodiment includes a processing device or processor 1402, a main memory 1404 (e.g., read-only memory (ROM), flash memory, dynamic random access memory (DRAM), such as synchronous DRAM (SDRAM), etc.), and a static memory 1406 (e.g., flash memory, static random access memory (SRAM), etc.), which may communicate with each other via a data bus 1408. Alternatively, the processor 1402 may be connected to the main memory 1404 and/or the static memory 1406 directly or via some other connectivity means. The processor 1402 may be a controller including the controller 438 of FIG. 4, as an example, and the main memory 1404 or the static memory 1406 may be any type of memory.

The processor 1402 represents one or more general-purpose processing devices, such as a microprocessor, central processing unit, or the like. More particularly, the processor 1402 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1402 is configured to execute processing logic in instructions for performing the operations and steps discussed herein.

The computer system 1400 may further include a network interface device 1410. The computer system 1400 also may or may not include an input 1412, configured to receive input and selections to be communicated to the computer system 1400 when executing instructions. The computer system 1400 also may or may not include an output 1414, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1400 may or may not include a data storage device that includes instructions 1416 stored in a computer-readable medium 1418. The instructions 1416 may also reside, completely or at least partially, within the main memory 1404 and/or within the processor 1402 during execution thereof by the computer system 1400, the main memory 1404 and the processor 1402 also constituting computer-readable medium. The instructions 1416 may further be transmitted or received over a network 1420 via the network interface device 1410.

While the computer-readable medium 1418 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit in a wireless distribution system (WDS), comprising:
   an antenna array comprising a plurality of radio frequency (RF) antennas configured to transmit a plurality of modified downlink RF signals in at least one formed radiation beam in at least one radiation direction;
   a plurality of phase shifters configured to:
      phase-shift a plurality of downlink RF signals to generate the plurality of modified downlink RF signals in a plurality of phases, respectively; and
      provide the plurality of modified downlink RF signals to the plurality of RF antennas in the antenna array; and
   a control circuit configured to:
      determine the plurality of phases to cause the plurality of RF antennas to transmit the plurality of modified downlink RF signals in the at least one formed radiation beam in the at least one radiation direction; and
      control the plurality of phase shifters to generate the plurality of modified downlink RF signals in the plurality of phases, respectively;
   wherein each of the plurality of phase shifters comprises:
      a first switched line phase shifter configured to phase-shift a respective downlink RF signal among the plurality of downlink RF signals by zero degrees (0°) or one hundred eighty degrees (180°) to generate a first intermediate downlink RF signal;
      a reflective phase shifter configured to phase-shift the first intermediate downlink RF signal between zero degrees (0°) and ninety degrees (90°) to generate a second intermediate downlink RF signal; and
      a second switched line phase shifter configured to phase-shift the second intermediate downlink RF signal by zero degrees (0°) or ninety degrees (90°) to generate a respective modified downlink RF signal among the plurality of modified downlink RF signals.

2. The remote unit of claim 1, wherein the antenna array comprises a plurality of omnidirectional RF antennas configured to transmit the plurality of modified downlink RF signals in the at least one formed radiation beam in the at least one radiation direction.

3. A remote unit in a wireless distribution system (WDS), comprising:
   an antenna array comprising a plurality of radio frequency (RF) antennas configured to transmit a plurality of modified downlink RF signals in at least one formed radiation beam in at least one radiation direction;
   a plurality of phase shifters configured to:
      phase-shift a plurality of downlink RF signals to generate the plurality of modified downlink RF signals in a plurality of phases, respectively; and
      provide the plurality of modified downlink RF signals to the plurality of RF antennas in the antenna array; and
   a control circuit configured to:
      determine the plurality of phases to cause the plurality of RF antennas to transmit the plurality of modified downlink RF signals in the at least one formed radiation beam in the at least one radiation direction;
      control the plurality of phase shifters to generate the plurality of modified downlink RF signals in the plurality of phases, respectively;
   a duplexer circuit configured to receive a downlink RF communications signal corresponding to one or more downlink communications services and configured to be transmitted from the remote unit in a predetermined RF band; and
   a splitter combiner configured to:
      split the downlink RF communications signal into the plurality of downlink RF signals; and
      provide the plurality of downlink RF signals to the plurality of phase shifters, respectively.

4. The remote unit of claim 3, wherein each of the plurality of phase shifters comprises:
   a first switched line phase shifter configured to phase-shift a respective downlink RF signal among the plurality of downlink RF signals by zero degrees (0°) or one hundred eighty degrees (180°) to generate a first intermediate downlink RF signal;
   a reflective phase shifter configured to phase-shift the first intermediate downlink RF signal between zero degrees (0°) and ninety degrees (90°) to generate a second intermediate downlink RF signal; and
   a second switched line phase shifter configured to phase-shift the second intermediate downlink RF signal by zero degrees (0°) or ninety degrees (90°) to generate a respective modified downlink RF signal among the plurality of modified downlink RF signals.

5. The remote unit of claim 3, wherein:
   the plurality of RF antennas is further configured to receive a plurality of modified uplink RF signals, respectively;
   the plurality of phase shifters is further configured to generate a plurality of uplink RF signals based on the plurality of modified uplink RF signals, respectively; and
   the splitter combiner is further configured to:
      combine the plurality of uplink RF signals to generate an uplink RF communications signal associated with one or more uplink communications services; and
      provide the uplink RF communications signal to the duplexer circuit.

6. The remote unit of claim 3, wherein:
   X first RF antennas selected from the plurality of RF antennas are disposed uniformly on a first line, wherein each of the X first RF antennas is separated from an immediately adjacent first RF antenna by a predetermined distance;
   X−1 second RF antennas selected from the plurality of RF antennas are disposed uniformly on a second line located immediately adjacent to the first line and separated from the first line by a line separation distance, wherein each of the X−1 second RF antennas is separated from an immediately adjacent second RF antenna by the predetermined distance;
   X−1 third RF antennas selected from the plurality of RF antennas are disposed uniformly on a third line located immediately adjacent to the first line and separated from the first line by the line separation distance, wherein each of the X−1 third RF antennas is separated from an immediately adjacent third RF antenna by the predetermined distance;

X−2 fourth RF antennas selected from the plurality of RF antennas are disposed uniformly on a fourth line located immediately adjacent to the second line and separated from the second line by the line separation distance, wherein each of the X−2 fourth RF antennas is separated from an immediately adjacent fourth RF antenna by the predetermined distance; and X−2 fifth RF antennas selected from the plurality of RF antennas are disposed uniformly on a fifth line located immediately adjacent to the third line and separated from the third line by the line separation distance, wherein each of the X−2 fifth RF antennas is separated from an immediately adjacent fifth RF antenna by the predetermined distance, wherein X is an integer variable.

7. The remote unit of claim 6, wherein the predetermined distance equals one-half of a wavelength of a center frequency of the predetermined RF band.

8. The remote unit of claim 3, wherein:
the antenna array comprises nineteen RF antennas configured to transmit nineteen modified downlink RF signals in the at least one formed radiation beam in the at least one radiation direction;
the plurality of phase shifters comprises nineteen phase shifters configured to:
  phase-shift nineteen downlink RF signals to generate the nineteen modified downlink RF signals in nineteen phases, respectively; and
  provide the nineteen modified downlink RF signals to the nineteen RF antennas in the antenna array; and
the control circuit is configured to:
  determine the nineteen phases to cause the nineteen RF antennas to transmit the nineteen modified downlink RF signals in the at least one formed radiation beam in the at least one radiation direction; and
  control the nineteen phase shifters to generate the nineteen modified downlink RF signals in the nineteen phases, respectively.

9. The remote unit of claim 8, wherein the splitter combiner comprises:
a first three-way splitter configured to split the downlink RF communications signal having a determined power level to generate three first downlink RF signals, each having one-third of the determined power level;
three second three-way splitters each configured to split the three first downlink RF signals to generate nine second downlink RF signals, each having one-ninth of the determined power level;
eight two-way splitters configured to split eight of the nine second downlink RF signals to generate sixteen of the nineteen downlink RF signals, each having one-eighteenth of the determined power level; and
a third three-way splitter configured to split one of the nine second downlink RF signals to generate three of the nineteen downlink RF signals, each having one-twenty-seventh of the determined power level.

10. The remote unit of claim 9, wherein the nineteen RF antennas in the antenna array are disposed in a circular-shaped area.

11. The remote unit of claim 10, wherein:
one first selected RF antenna among the nineteen RF antennas is disposed at a center point of the circular-shaped area;

six second selected RF antennas among the nineteen RF antennas are disposed respectively at six first vertices of a first regular hexagon having a first radius extending from the center point of the circular-shaped area;
six third selected RF antennas among the nineteen RF antennas are disposed respectively at six second vertices of a second regular hexagon having a second radius extending from the center point of the circular-shaped area, wherein the second radius equals two times the first radius; and
six fourth selected RF antennas among the nineteen RF antennas are disposed respectively at six respective midpoints of six sides of the second regular hexagon.

12. The remote unit of claim 11, wherein three of the six second selected RF antennas disposed at the six first vertices of the first regular hexagon are configured to receive the three downlink RF signals having the one-twenty-seventh of the determined power level.

13. The remote unit of claim 11, wherein:
the nineteen RF antennas are configured to transmit the nineteen modified downlink RF signals in the predetermined RF band; and
the first radius of the first regular hexagon equals one-half of a wavelength of a center frequency of the predetermined RF band.

14. The remote unit of claim 3, further comprising a second RF antenna configured to:
transmit a second downlink RF communications signal in a second predetermined RF band located in a lower frequency spectrum than the predetermined RF band; and
receive a second uplink RF communications signal in the second predetermined RF band.

15. The remote unit of claim 3, further comprising:
a plurality of second phase shifters configured to phase-shift a plurality of second downlink RF signals to generate a plurality of second modified downlink RF signals in a plurality of second phases, respectively;
a second splitter combiner configured to:
  split a second downlink RF communications signal into the plurality of second downlink RF signals; and
  provide the plurality of second downlink RF signals to the plurality of second phase shifters, respectively; and
a plurality of multiple-input multiple-output (MIMO) splitter combiners configured to:
  receive the plurality of modified downlink RF signals from the plurality of phase shifters, respectively;
  receive the plurality of second modified downlink RF signals from the plurality of second phase shifters, respectively;
  generate a plurality of downlink MIMO signals based on the plurality of modified downlink RF signals and the plurality of second modified downlink RF signals, respectively; and
  provide the plurality of downlink MIMO signals to the plurality of RF antennas in the antenna array.

16. A method for supporting antenna array beamforming in a remote unit in a wireless distribution system (WDS), comprising:
determining a plurality of phases to cause a plurality of radio frequency (RF) antennas in an antenna array in the remote unit to transmit a plurality of modified downlink RF signals in at least one formed radiation beam in at least one radiation direction;

phase-shifting a plurality of downlink RF signals to generate the plurality of modified downlink RF signals in the plurality of phases, respectively;
providing the plurality of modified downlink RF signals to the plurality of RF antennas in the antenna array;
transmitting the plurality of modified downlink RF signals from the plurality of RF antennas in the at least one formed radiation beam in the at least one radiation direction;
disposing X first RF antennas selected from the plurality of RF antennas uniformly on a first line, wherein each of the X first RF antennas is separated from an immediately adjacent first RF antenna by a predetermined distance;
disposing X−1 second RF antennas selected from the plurality of RF antennas uniformly on a second line located immediately adjacent to the first line and separated from the first line by a line separation distance, wherein each of the X−1 second RF antennas is separated from an immediately adjacent second RF antenna by the predetermined distance;
disposing X−1 third RF antennas selected from the plurality of RF antennas uniformly on a third line located immediately adjacent to the first line and separated from the first line by the line separation distance, wherein each of the X−1 third RF antennas is separated from an immediately adjacent third RF antenna by the predetermined distance;
disposing X−2 fourth RF antennas selected from the plurality of RF antennas uniformly on a fourth line located immediately adjacent to the second line and separated from the second line by the line separation distance, wherein each of the X−2 fourth RF antennas is separated from an immediately adjacent fourth RF antenna by the predetermined distance; and
disposing X−2 fifth RF antennas selected from the plurality of RF antennas uniformly on a fifth line located immediately adjacent to the third line and separated from the third line by the line separation distance, wherein each of the X−2 fifth RF antennas is separated from an immediately adjacent fifth RF antenna by the predetermined distance, wherein X is an integer variable.

17. A method for supporting antenna array beamforming in a remote unit in a wireless distribution system (WDS), comprising:
determining a plurality of phases to cause a plurality of radio frequency (RF) antennas in an antenna array in the remote unit to transmit a plurality of modified downlink RF signals in at least one formed radiation beam in at least one radiation direction;
phase-shifting a plurality of downlink RF signals to generate the plurality of modified downlink RF signals in the plurality of phases, respectively;
providing the plurality of modified downlink RF signals to the plurality of RF antennas in the antenna array;
transmitting the plurality of modified downlink RF signals from the plurality of RF antennas in the at least one formed radiation beam in the at least one radiation direction;
receiving a downlink RF communications signal corresponding to one or more downlink communications services and configured to be transmitted from the remote unit in a predetermined RF band; and
splitting the downlink RF communications signal into the plurality of downlink RF signals.

18. The method of claim 17, further comprising:
providing nineteen RF antennas in the antenna array in the remote unit;
determining nineteen phases to cause the nineteen RF antennas to transmit nineteen modified downlink RF signals in the at least one formed radiation beam in the at least one radiation direction;
phase-shifting nineteen downlink RF signals to generate the nineteen modified downlink RF signals in the nineteen phases, respectively; and
transmitting the nineteen modified downlink RF signals from the nineteen RF antennas in the at least one formed radiation beam in the at least one radiation direction.

19. The method of claim 18, further comprising:
splitting the downlink RF communications signal having a determined power level to generate three first downlink RF signals, each having one-third of the determined power level;
splitting the three first downlink RF signals to generate nine second downlink RF signals, each having one-ninth of the determined power level;
splitting eight of the nine second downlink RF signals to generate sixteen of the nineteen downlink RF signals, each having one-eighteenth of the determined power level; and
splitting one of the nine second downlink RF signals to generate three of the nineteen downlink RF signals, each having one-twenty-seventh of the determined power level.

20. The method of claim 19, further comprising disposing the nineteen RF antennas in a circular-shaped area.

21. The method of claim 20, further comprising:
disposing one first selected RF antenna among the nineteen RF antennas at a center point of the circular-shaped area;
disposing six second selected RF antennas among the nineteen RF antennas respectively at six first vertices of a first regular hexagon having a first radius extending from the center point of the circular-shaped area;
disposing six third selected RF antennas among the nineteen RF antennas respectively at six second vertices of a second regular hexagon having a second radius extending from the center point of the circular-shaped area, wherein the second radius equals two times the first radius; and
disposing six fourth selected RF antennas among the nineteen RF antennas respectively at six respective midpoints of six sides of the second regular hexagon.

22. The method of claim 21, further comprising receiving the three downlink RF signals having the one-twenty-seventh of the determined power level at three of the six second selected RF antennas disposed at the six first vertices of the first regular hexagon.

23. The method of claim 21, further comprising:
transmitting the nineteen modified downlink RF signals in the predetermined RF band; and
configuring the first radius of the first regular hexagon to equal one-half of a wavelength of a center frequency of the predetermined RF band.

24. A method for supporting antenna array beamforming in a remote unit in a wireless distribution system (WDS), comprising:
determining a plurality of phases to cause a plurality of radio frequency (RF) antennas in an antenna array in the remote unit to transmit a plurality of modified downlink RF signals in at least one formed radiation beam in at least one radiation direction;

phase-shifting a plurality of downlink RF signals to generate the plurality of modified downlink RF signals in the plurality of phases, respectively;

providing the plurality of modified downlink RF signals to the plurality of RF antennas in the antenna array;

transmitting the plurality of modified downlink RF signals from the plurality of RF antennas in the at least one formed radiation beam in the at least one radiation direction;

receiving a plurality of modified uplink RF signals from the plurality of RF antennas, respectively;

generating a plurality of uplink RF signals based on the plurality of modified uplink RF signals, respectively; and combining the plurality of uplink RF signals to generate an uplink RF communications signal associated with one or more uplink communications services.

25. The method of claim 17, further comprising:

transmitting a second downlink RF communications signal from a second RF antenna in a second predetermined RF band located in a lower frequency spectrum than the predetermined RF band; and receiving a second uplink RF communications signal in the second predetermined RF band.

* * * * *